United States Patent
Oonishi et al.

(10) Patent No.: US 11,292,989 B2
(45) Date of Patent: Apr. 5, 2022

(54) POWDERED FAT/OIL COMPOSITION, FOOD INCLUDING POWDERED FAT/OIL COMPOSITION, AND METHODS FOR PRODUCING SAME

(71) Applicant: THE NISSHIN OILLIO GROUP, LTD., Tokyo (JP)

(72) Inventors: Kiyomi Oonishi, Yokohama (JP); Tomohiro Aibara, Yokohama (JP); Noriko Murayama, Yokohama (JP); Muneo Tsukiyama, Yokohama (JP); Seiya Takeguchi, Yokohama (JP); Hidetaka Uehara, Yokohama (JP); Tatsuya Kobayashi, Yokohama (JP); Hirofumi Denda, Yokohama (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 993 days.

(21) Appl. No.: 15/327,734

(22) PCT Filed: Jul. 22, 2015

(86) PCT No.: PCT/JP2015/070850
§ 371 (c)(1),
(2) Date: Jan. 20, 2017

(87) PCT Pub. No.: WO2016/013582
PCT Pub. Date: Jan. 28, 2016

(65) Prior Publication Data
US 2017/0208829 A1  Jul. 27, 2017

(30) Foreign Application Priority Data

Jul. 22, 2014 (JP) .............................. JP2014-149168
Feb. 26, 2015 (JP) .............................. JP2015-037108

(51) Int. Cl.
*C11C 3/06* (2006.01)
*A23D 9/02* (2006.01)
(Continued)

(52) U.S. Cl.
CPC .................. *C11C 3/06* (2013.01); *A23D 9/02* (2013.01); *A23D 9/04* (2013.01); *A23D 9/05* (2013.01);
(Continued)

(58) Field of Classification Search
CPC ... A23D 9/05; A23D 9/04; A23D 9/02; C11C 3/06; C11C 3/02; C11B 15/00
See application file for complete search history.

(56) References Cited

U.S. PATENT DOCUMENTS 3,796,816 A   3/1974  Hasman et al.
4,877,636 A  10/1989  Koyano et al.
(Continued)

FOREIGN PATENT DOCUMENTS

CA      2922936 A1    3/2015
CN    101909453 A    12/2010
(Continued)

OTHER PUBLICATIONS

Amir et al., "Interesterification of fats and oils—A Review". from Pak. J. Food Sci., 22(3), pp. 143-153. (Year: 2012).*
(Continued)

*Primary Examiner* — Erik Kashnikow
*Assistant Examiner* — Assaf Zilbering
(74) *Attorney, Agent, or Firm* — Buchanan Ingersoll & Rooney PC

(57) ABSTRACT

An object of the present invention is to provide a powdered fat and/or oil composition, a food containing the powdered fat and/or oil composition, and methods for producing these. Specifically, provided are a fat and/or oil composition con-
(Continued)

taining 65 to 99% by mass of a XXX triglyceride and 35 to 1% by mass of X2Y triglycerides, a powdered fat and/or oil composition obtained from the fat and/or oil composition, a food containing the powdered fat and/or oil composition, and methods for producing these.

19 Claims, 3 Drawing Sheets

(51) Int. Cl.
| | |
|---|---|
| *C11B 15/00* | (2006.01) |
| *A23D 9/04* | (2006.01) |
| *C11C 3/02* | (2006.01) |
| *A23D 9/05* | (2006.01) |
| *C11C 3/10* | (2006.01) |
| *A23G 1/36* | (2006.01) |

(52) U.S. Cl.
CPC ............... *A23G 1/36* (2013.01); *C11B 15/00* (2013.01); *C11C 3/02* (2013.01); *C11C 3/10* (2013.01)

(56) References Cited

U.S. PATENT DOCUMENTS

| | | | |
|---|---|---|---|
| 5,514,406 | A | 5/1996 | Aoe et al. |
| 6,090,598 | A | 7/2000 | Yamaguchi et al. |
| 8,535,749 | B2 | 9/2013 | Akahane et al. |
| 9,695,384 | B2 | 7/2017 | Schweitzer et al. |
| 2006/0115882 | A1 | 6/2006 | Negishi et al. |
| 2008/0089981 | A1 | 4/2008 | Butler et al. |
| 2010/0104694 | A1 | 4/2010 | Schweitzer et al. |
| 2010/0278985 | A1 | 11/2010 | Akahane et al. |
| 2011/0052771 | A1 | 3/2011 | Rumbaut et al. |
| 2011/0200734 | A1 | 8/2011 | Nosaka et al. |
| 2011/0223225 | A1* | 9/2011 | Mezzenga ............. A23D 7/0053 424/401 |
| 2011/0318453 | A1 | 12/2011 | Suganuma et al. |
| 2013/0230634 | A1 | 9/2013 | Arai et al. |
| 2016/0213020 | A1 | 7/2016 | Oonishi |
| 2017/0267945 | A1 | 9/2017 | Schweitzer et al. |
| 2018/0027838 | A1 | 2/2018 | Suzuki et al. |
| 2018/0035688 | A1 | 2/2018 | Oonishi et al. |
| 2018/0042259 | A1 | 2/2018 | Oonishi et al. |
| 2018/0161301 | A1 | 6/2018 | Nosaka et al. |
| 2018/0249729 | A1 | 9/2018 | Kataoka et al. |
| 2018/0256531 | A1 | 9/2018 | Nosaka et al. |
| 2019/0021355 | A1 | 1/2019 | Takeguchi et al. |
| 2019/0021359 | A1 | 1/2019 | Kataoka et al. |
| 2019/0029283 | A1 | 1/2019 | Kataoka et al. |
| 2019/0031976 | A1 | 1/2019 | Takeguchi et al. |

FOREIGN PATENT DOCUMENTS

| | | | | |
|---|---|---|---|---|
| CN | 102421883 | A | 4/2012 | |
| CN | 103402364 | A | 11/2013 | |
| CN | 106536696 | A | 3/2017 | |
| CN | 107249344 | A | 10/2017 | |
| CN | 107249346 | A | 10/2017 | |
| CN | 107404893 | A | 11/2017 | |
| CN | 108024550 | A | 5/2018 | |
| DE | 2832636 | A1 * | 3/1980 | ............. A23D 7/001 |
| EP | 0209327 | A2 | 1/1987 | |
| EP | 0 536 824 | B1 | 11/1995 | |
| EP | 1776870 | B1 | 7/2011 | |
| EP | 2 622 966 | A1 | 8/2013 | |
| EP | 2839750 | A1 | 2/2015 | |
| EP | 3173464 | A1 | 5/2017 | |
| EP | 3 262 948 | A1 | 1/2018 | |
| EP | 3 262 949 | A1 | 1/2018 | |
| GB | 879211 | A | 10/1961 | |
| GB | 1316079 | A | 5/1973 | |
| GB | 1564363 | A | 4/1980 | |
| GB | 1564363 | A * | 4/1980 | ............. C11B 15/00 |
| JP | 52-071390 | A | 6/1977 | |
| JP | 63-240745 | A | 10/1988 | |
| JP | H-02299544 | A | 12/1990 | |
| JP | H03-287880 | A | 12/1991 | |
| JP | 05-137506 | A | 6/1993 | |
| JP | 2700377 | B2 | 10/1993 | |
| JP | 2646422 | B2 | 12/1993 | |
| JP | 06-33087 | A | 2/1994 | |
| JP | 06-245700 | A | 9/1994 | |
| JP | H-08-27 | B2 | 1/1996 | |
| JP | 3083967 | B2 | 8/1996 | |
| JP | 08205773 | A | 8/1996 | |
| JP | 10295307 | A | 11/1998 | |
| JP | 2002-539782 | A | 11/2002 | |
| JP | 2003-135001 | A | 5/2003 | |
| JP | 2005073610 | A | 3/2005 | |
| JP | 2005-350660 | A | 12/2005 | |
| JP | 2006000087 | A | 1/2006 | |
| JP | 2006-109731 | A | 4/2006 | |
| JP | 3817450 | B2 | 9/2006 | |
| JP | 2007236289 | A | 9/2007 | |
| JP | 2007-289116 | A | 11/2007 | |
| JP | 4352103 | B2 | 7/2009 | |
| JP | 2009-249614 | A | 10/2009 | |
| JP | 2012157370 | A | 8/2012 | |
| JP | 2012249617 | A | 12/2012 | |
| JP | 5501764 | B2 | 5/2014 | |
| JP | 2014124093 | A | 7/2014 | |
| JP | 2014212731 | A | 11/2014 | |
| JP | 2015-070837 | A | 4/2015 | |
| WO | WO 2005/005586 | A1 | 1/2005 | |
| WO | WO 2008/104381 | A1 | 9/2008 | |
| WO | WO-2008123946 | A1 * | 10/2008 | ........... A23K 20/147 |
| WO | 2010052847 | A1 | 5/2010 | |
| WO | 2011134627 | A1 | 11/2011 | |
| WO | WO 2012/043548 | A1 | 4/2012 | |
| WO | WO 2012/169457 | A1 | 12/2012 | |
| WO | 2014/069218 | A1 | 5/2014 | |
| WO | 2014087724 | A1 | 6/2014 | |
| WO | 2016/013582 | A1 | 1/2016 | |

OTHER PUBLICATIONS

Spiros et al., "Powdered Solution Technology: Principles and Mechanism". Phjarmaceutical Reserach, vol. 9. No. 10 (Year: 1992).*
Communication pursuant to Article 94(3) EPC issued by the European Patent Office in corresponding European Patent Application No. 15824376.6-1105 dated Jan. 8, 2019 (6 pages).
International Search Report (PCT/ISA/210) dated Oct. 27, 2015, by the Japanese Patent Office as the International Searching Authority for International Application No. PCT/JP2015/070850.
Written Opinion (PCT/ISA/237) dated Oct. 27, 2015, by the Japanese Patent Office as the International Searching Authority for International Application No. PCT/JP2015/070850.
The First Office Action issued by The State Intellectual Property Office of People's Republic of China in corresponding Chinese Patent Application No. 201580040036.5 dated Mar. 28, 2010 (17 pages including partial English translation).
Ishikawa et al.: "Polymorphic Behavior of Palm Oil and Modified Palm Oils", Food Science and Technology International, (Jan. 1, 1997), vol. 3, No. 1, pp. 77-81, XP002716821.
Extended Search Report dated Nov. 23, 2017, by the European Patent Office in corresponding European Patent Application No. 15824376.6 (9 pages).
Office Action dated Oct. 20, 2020, by the U.S. Patent and Trademark Office in U.S. Appl. No. 15/762,971. (10 pages).
Ribeiro et al., "Crystallization modifiers in lipid systems," Journal of Food Science and Technology, Jul. 2015, vol. 52, No. 7, pp. 3925-3946.
Yang et al., "Refined cottonseed oil as a replacement for soybean oil in broiler diet," Food Science and Nutrition, Feb. 2019, vol. 7, No. 3, pp. 1027-1034.
Notice of Allowance dated Sep. 27, 2021, by the U.S. Patent and Trademark Office in U.S. Appl. No. 16/071,734. (9 pages).

(56) References Cited

OTHER PUBLICATIONS

Notice of Allowance dated Aug. 4, 2021, by the U.S. Patent and Trademark Office in U.S. Appl. No. 15/762,971. (9 pages).
Notice of Allowance dated Sep. 22, 2021, by the U.S. Patent and Trademark Office in U.S. Appl. No. 16/071,746. (9 pages).
Notice of Allowance dated Oct. 1, 2021, by the U.S. Patent and Trademark Office in U.S. Appl. No. 16/071,796. (9 pages).
Notice of Allowance dated Oct. 1, 2021, by the U.S. Patent and Trademark Office in U.S. Appl. No. 16/071,830. (9 pages).
Office Action dated Feb. 3, 2021 by the U.S. Patent and Trademark Office in U.S. Appl. No. 15/553,640. (11 pages).
Office Action dated Feb. 4, 2021 by the U.S. Patent and Trademark Office in U.S. Appl. No. 16/071,746. (13 pages).
Office Action dated Mar. 12, 2021 by the U.S. Patent and Trademark Office in U.S. Appl. No. 15/762,971. (7 pages).
Office Action dated Mar. 18, 2021 by the U.S. Patent and Trademark Office in U.S. Appl. No. 15/553,771. (8 pages).
Kebakile, "The Production of a High Free-Fat Whole Milk Powder for the Chocolate Industry; The Spray Chilling Technology" Thesis, Massey University (1996) (111 pages).
First Office Action dated Feb. 27, 2020, by the State Intellectual Property Office of People's Republic of China n Chinese Patent Application No. 201680012214.8, with an English translation of the Office Action. (17 pages).
Office Action issued by the U.S. Patent and Trademark Office in the U.S. Appl. No. 15/553,906, dated Mar. 30, 2020, U.S. Patent and Trademark Office, Alexandria, VA. (18 pages).
Extended Search Report issued by the European Patent Office in European Patent Application No. 16755551.5-1105 dated Sep. 20, 2018 (9 pages).
Office Action dated Dec. 25, 2019, by the State Intellectual Property Office of the People's Republic of China in Chinese Patent Application No. 201680012188.9 and an English translation of the Office Action. (17 pages).
Lipp et al.: "Review of cocoa butter and alternative fats for use in chocolate—Part A. Compositional data," Food Chemistry, Elsevier Ltd, NL, vol. 62, No. 1, Jan. 1, 1998, pp. 73-97.
Extended Search Report issued by the European Patent Office in European Patent Application No. 16755552.3-1106 dated Jul. 17, 2018 (8 pages).
Communication pursuant to Article 94(3) EPC issued by the European Patent Office in European Patent Application No. 16755551.7-1105 dated Aug. 23, 2019 (5 pages).
International Search Report (PCT/ISN210) dated May 10, 2016, by the Japanese Patent Office as the International Searching Authority for International Application No. PCT/JP2016/055420.
Written Opinion (PCT /ISN237) dated May 10, 2016, by the Japanese Patent Office as the International Searching Authority for International Application No. PCT/JP2016/055420.
International Search Report (PCT/ISN210} dated May 10, 2016, by the Japanese Patent Office as the International Searching Authority for International Application No. PCT/JP2016/055421.
Written Opinion (PCT/ISN237) dated May 10, 2016, by the Japanese Patent Office as the International Searching Authority for International Application No. PCT /JP2016/055421.
International Search Report (PCT/ISN210) dated May 10, 2016, by the Japanese Patent Office as the International Searching Authority for International Application No. PCT/JP2016/055422.
Written Opinion (PCT /ISN237) dated May 10, 2016, by the Japanese Patent Office as the International Searching Authority for International Application No. PCT/JP2016/055422.
Extended Search Report issued by the European Patent Office in European Patent Application No. 16755550.7-1105 dated Aug. 6, 2018 (9 pages).
Office Action (First Office Action) dated Apr. 28, 2020, by the State Intellectual Property Office of People's Republic of China in Chinese Patent Application No. 201780007669.5 and an English Translation of the Office Action. (17 pages).

The extended European Search Report dated Aug. 14, 2019, by the European Patent Office in European Patent Application No. 17741542.9. (7 pages).
Office Action dated Jun. 14, 2017, by the Japanese Patent Office in Japanese Patent Application No. 2017-522695. (2 pages).
Ciftci et al.: "Formation of solid lipid microparticles from fully hydrogenated canola oil using supercritical carbon dioxide," Journal of Food Engineering, Barking, Essex, GB, vol. 178, Jan. 19, 2016, pp. 137-144, KP029431886.
Millqvist-Fureby: "Characterisation of spray-dried emulsions with mixed fat phases," Colloids and Surfaces. B, Biointerfaces, vol. 31, No. 1-4, Sep. 1, 2003, pp. 65-79, XP55614221, NL.
Office Action dated Jun. 14, 2017, by the Japanese Patent Office in Japanese Patent Application No. 2017-522697. (2 pages).
The First Office Action dated Apr. 8, 2020, by the State Intellectual Property Office of People's Republic of China in Chinese Patent Application No. 201780007637.5, and an English translation of the Office Action. (21 pages).
Japanese Patent Office Publication, Hyoujun Gijutsu-Shu, 2006 (Flavors), 2-2 Processing Techniques for Flavors, 2-2-2 Powders and Granules, Published on Mar. 14, 2007, pp. 328-330 (4 pages including partial English Translation).
International Search Report (PCT/ISA/210) dated Dec. 6, 2016, by the Japanese Patent Office as the International Searching Authority for International Application No. PCT/JP2016/078122.
Written Opinion (PCT/ISA/237) dated Dec. 6, 2016, by the Japanese Patent Office as the International Searching Authority for International Application No. PCT/JP2016/078122.
Extended Search Report issued by the European Patent Office in European Patent Application 2 No. 16848698.3-1106 dated May 22, 2019.
International Search Report {PCT/ISA/210) and the Written Opinion of the International Searching Authority Form PCT/ISA/237) dated Mar. 7, 2017, by the Japanese Patent Office in the International Application No. PCT/JP2017/001952. (7 pages).
International Search Report {PCT/ISA/210) and the Written Opinion of the International Searching Authority Form PCT/ISA/237) dated Mar. 7, 2017, by the Japanese Patent Office in the International Application No. PCT/JP2017/001953. (10 pages).
International Search Report {PCT/ISA/210) and the Written Opinion of the International Searching Authority Form PCT/ISA/237) dated Mar. 7, 2017, by the Japanese Patent Office in the International Application No. PCT/JP2017/001954. (9 pages).
The extended European Search Report dated Aug. 30, 2019, by the European Patent Office in European Patent Application No. 17741544.5. (7 pages).
The extended European Search Report dated Sep. 9, 2019, by the European Patent Office in European Patent Application No. 17741543.7. (8 pages).
International Search Report (PCT/ISA/210) dated Mar. 7, 2017, by the Japanese Patent Office as the International Searching Authority for International Application No. PCT/JP2017/001951.
Written Opinion (PCT/ISA/237) dated Mar. 7, 2017, by the Japanese Patent Office as the International Searching Authority for International Application No. PCT/JP2017/001951.
Apha F A C Gardner: "Lovibond 5.25" Cell Fatty Acid Specifications Typical Fatty Acid Composition % Packing, Nov. 19, 2008, XP055615791. (1 page).
Nolen: "Biological Evaluation of Hydrogenated Rapeseed Oil," Journal of the American Oil Chemists' Society (JAOCS), vol. 58, No. 1, Jan. 1, 1981, pp. 31-37, XP55614258, DE.
Office Action issued by the U.S. Patent and Trademark Office in U.S. Appl. No. 15/553,640, dated Jun. 26, 2020, U.S. Patent and Trademark Office, Alexandria, VA. (8 pages).
Office Action issued by the U.S. Patent and Trademark Office in U.S. Appl. No. 15/553,771, dated Sep. 16, 2020, U.S. Patent and Trademark Office, Alexandria, VA. (8 pages).
Office Action issued by the U.S. Patent and Trademark Office in U.S. Appl. No. 15/553,640, dated Nov. 1, 2019, U.S. Patent and Trademark Office, Alexandria, VA. (8 pages).
Office Action issued by the U.S. Patent and Trademark Office in U.S. Appl. No. 15/553,906, dated Aug. 30, 2019, U.S. Patent and Trademark Office, Alexandria, VA. (17 pages).

(56) References Cited

OTHER PUBLICATIONS

Office Action issued by the U.S. Patent and Trademark Office in U.S. Appl. No. 15/553,906, dated Sep. 22, 2020, U.S. Patent and Trademark Office, Alexandria, VA. (23 pages).
Office Action issued by the U.S. Patent and Trademark Office in U.S. Appl. No. 16/071,796, dated Apr. 2, 2020, U.S. Patent and Trademark Office, Alexandria, VA. (7 pages).
Office Action issued by the U.S. Patent and Trademark Office in U.S. Appl. No. 16/071,796, dated Oct. 7, 2020, U.S. Patent and Trademark Office, Alexandria, VA. (9 pages).
Office Action issued by the U.S. Patent and Trademark Office in U.S. Appl. No. 16/071,830, dated Oct. 7, 2020, U.S. Patent and Trademark Office, Alexandria, VA. (9 pages).
The extended European Search Report dated Jan. 24, 2020, by the European Patent Office in European Patent Application No. 17741545.2. (11 pages).
Communication pursuant to Article 94(3) EPC dated May 11, 2021, by the European Patent Office in European Patent Application No. 16755551.5. (5 pages).
Office Action dated Jun. 8, 2021, by the U.S. Patent and Trademark Office in U.S. Appl. No. 15/553,906. (10 pages).
Office Action dated Apr. 1, 2021, by the U.S. Patent and Trademark Office in U.S. Appl. No. 16/071,734 (12 pages).
Office Action dated Apr. 1, 2021, by the U.S. Patent and Trademark Office in U.S. Appl. No. 16/071,796. (7 pages).
Office Action dated Apr. 1, 2021, by the U.S. Patent and Trademark Office in U.S. Appl. No. 16/071,830. (7 pages).

\* cited by examiner

POWDERED FAT/OIL COMPOSITION, FOOD INCLUDING POWDERED FAT/OIL COMPOSITION, AND METHODS FOR PRODUCING SAME

TECHNICAL FIELD

The present invention relates to a powdered fat and/or oil composition, a fat and/or oil composition for producing the powdered fat and/or oil composition, methods for producing these, a food containing the powdered fat and/or oil composition, and a method for producing the food. More specifically, the present invention relates to a fat and/or oil composition containing 65 to 99% by mass of a XXX triglyceride and 35 to 1% by mass of a X2Y triglyceride, a powdered fat and/or oil composition obtained from the fat and/or oil composition, a method for producing the powdered fat and/or oil composition, a food containing the powdered fat and/or oil composition, and a method for producing the food.

BACKGROUND ART

Powdered fat and/or oil compositions have been widely used in the field of foods such as cake mixes, coffee creams, and shortenings. As the method for powdering fats and/or oils, there have been known numerous powdering methods by spray drying (Patent Literatures 1 to 3). However, in each of these conventional techniques, an emulsion has to be prepared in which a fat and/or oil is dissolved in water for the spray drying. This makes the steps complicated and increases the cost. Besides, these techniques always have problems with the stability of the emulsions. Moreover, since various emulsifiers need to be added in order to stabilize such emulsions, it has been impossible to prepare powdered fat and/or oil compositions constituted only of a fat and/or oil.

As the method for producing a powder constituted only of a fat and/or oil, there have been known: a method in which a fat and/or oil is frozen in liquid nitrogen and pulverized and other similar methods; a method in which a fat and/or oil such as a highly hydrogenated oil having a high solid fat content at room temperature is pulverized with a pulverizer, followed by sieving to make the particle size uniform; and a method in which a fat and/or oil such as a highly hydrogenated oil having a high solid fat content at room temperature is melted and directly sprayed (Patent Literatures 4, 5). However, all of these are complicated and not suitable for the industrialization.

CITATION LIST

Patent Literatures

Patent Literature 1: Japanese Patent Application Publication No. Hei 5-137506
Patent Literature 2: Japanese Patent Application Publication No. Hei 6-33087
Patent Literature 3: Japanese Patent Application Publication No. 2007-289116
Patent Literature 4: Japanese Patent Application Publication No. Sho 63-240745
Patent Literature 5: Japanese Patent Application Publication No. Hei 6-245700

SUMMARY OF INVENTION

Technical Problems

An object of the present invention is to provide: a fat and/or oil composition containing 65 to 99% by mass of only one type or at least two types of XXX triglycerides having fatty acid residues X, each with a specific number of carbon atoms, at positions 1 to 3, and 35 to 1% by mass of one or more types of X2Y triglycerides each having a fatty acid residue Y with a specific number of carbon atoms in place of one of the fatty acid residues X of the XXX triglyceride; and a powdered fat and/or oil composition obtained from the fat and/or oil composition.

Moreover, an object of the present invention is to provide a method for obtaining a powdered fat and/or oil composition, the method including: mixing a XXX triglyceride having fatty acid residues X, each with x carbon atoms, at positions 1 to 3 and a YYY triglyceride having fatty acid residues Y, each with y carbon atoms, at positions 1 to 3 at a specific mass ratio; interesterifying the mixture; and cooling the resulting product.

Further, an object of the present invention is to provide a food containing the powdered fat and/or oil composition and a method for producing the food.

Solution to Problems

To achieve the above objects, the present inventors have found that incorporating a small amount of a X2Y triglyceride (at least one type) into a fat and/or oil composition mostly containing a XXX triglyceride (at least one type) forms a favorable powder. This finding has led to the present invention. Specifically, the present invention can include the following aspects.

[1] A fat and/or oil composition comprising:
65 to 99% by mass of one type of a XXX triglyceride having fatty acid residues X, each with x carbon atoms, at positions 1 to 3; and
35 to 1% by mass of one or more types of X2Y triglycerides each having a fatty acid residue Y with y carbon atoms in place of one of the fatty acid residues X of the XXX triglyceride,
provided that a total triglyceride content is 100% by mass, wherein
x number of carbon atoms is an integer selected from 8 to 20, and
y number of carbon atoms is an integer selected from x+2 to x+12 independently from the other y and satisfying y≤22.
[2] The fat and/or oil composition according to [1], comprising:
80 to 99% by mass of the XXX triglyceride; and
20 to 1% by mass of the one or more types of X2Y triglycerides in total.
[3] The fat and/or oil composition according to [1] or [2], wherein
the x is an integer selected from 10 to 18, and
the y is an integer selected from x+2 to x+10 independently from the other y and satisfying y≤22.
[4] The fat and/or oil composition according to any one of [1] to [3], wherein
the x is an integer selected from 10 to 12, and
the y is an integer selected from x+4 to x+8 independently from the other y and satisfying y≤22.
[5] The fat and/or oil composition according to any one of [1] to [4], which is in a powder form.

[6] The powdered fat and/or oil composition according to [5], which has a loose bulk density of 0.1 to 0.6 g/cm$^3$.

[7] A food comprising the fat and/or oil composition according to any one of [1] to [6].

[8] The food according to [7], wherein a content of the fat and/or oil composition is 0.1 to 99% by mass relative to a total mass of the food.

[9] The food according to [7] or [8], wherein the food is a powdered food.

[10] The food according to any one of [7] to [9], wherein the food is a ketogenic diet.

[11] A method for producing a powdered fat and/or oil composition, comprising the following steps of:

(a) preparing a fat and/or oil composition containing 65 to 99% by mass of a XXX triglyceride having fatty acid residues X, each with x carbon atoms, at positions 1 to 3, and 35 to 1% by mass of one or more types of X2Y triglycerides each having a fatty acid residue Y with y carbon atoms in place of one of the fatty acid residues X of the XXX triglyceride, provided that a total triglyceride content is 100% by mass, wherein x number of carbon atoms is an integer selected from 8 to 20, and y number of carbon atoms is an integer selected from x+2 to x+12 independently from the other y and satisfying y≤22; and (d) cooling the fat and/or oil composition in a molten state to obtain a powdered fat and/or oil composition.

[12] The method according to [11], comprising, before step (d), a step of (b) heating the fat and/or oil composition obtained in step (a) to melt the triglycerides incorporated in the fat and/or oil composition, thereby obtaining the fat and/or oil composition in the molten state.

[13] The method according to [11] or [12], comprising a seeding step (c1), a tempering step (c2), and/or a pre-cooling step (c3), wherein the seeding step (c1) includes adding 0.1 to 1 part by mass of a fat and/or oil powder containing the XXX triglyceride to 100 parts by mass of the fat and/or oil composition during the cooling in step (d), the tempering step (c2) includes maintaining a temperature, which is lower by 5 to 20° C. than a cooling temperature in step (d), before the cooling in step (d), and the pre-cooling step (c3) includes pre-cooling the fat and/or oil composition in the molten state used in step (d) at a temperature higher than the cooling temperature in step (d).

[14] The method according to any one of [11] to [13], wherein the powdered fat and/or oil composition obtained in step (d) is obtained by step (e) of pulverizing a solid resulting after the cooling in step (d) to obtain a powdered fat and/or oil composition.

[15] The method according to any one of [11] to [14], wherein the x is an integer selected from 10 to 18, and the y is an integer selected from x+2 to x+10 independently from the other y and satisfying y≤22.

[16] The method according to any one of [11] to [14], wherein the x is an integer selected from 10 to 12, and the y is an integer selected from x+4 to x+8 independently from the other y and satisfying y≤22.

[17] The method according to any one of [11] to [16], wherein the fat and/or oil composition obtained in step (a) is a fat and/or oil composition obtained through steps of:

mixing the XXX triglyceride and a YYY triglyceride having fatty acid residues Y, each with y carbon atoms, at positions 1 to 3 at a mass ratio of XXX triglyceride/YYY triglyceride being 90/10 to 99/1 to obtain a reaction substrate; and heating the reaction substrate, followed by an interesterification in presence of a catalyst.

[18] The method according to any one of [11] to [16], wherein the fat and/or oil composition obtained in step (a) is produced by direct synthesis from raw materials including fatty acids or raw materials including fatty acid derivatives and glycerin.

[19] The method according to [17], wherein the catalyst is an enzyme or an alkali metal alkoxide.

[20] The method according to [17], wherein the catalyst is a lipase derived from *Alcaligenes* sp. or sodium methoxide.

[21] A method for producing a food containing a powdered fat and/or oil composition, the method comprising the steps of:

producing a powdered fat and/or oil composition by the method according to any one of [11] to [20]; and (f) adding the powdered fat and/or oil composition to a food raw material to obtain a food containing the powdered fat and/or oil composition.

[22] The production method according to [21], wherein, in step (f), the powdered fat and/or oil composition is added in the amount of 0.1 to 99% by mass of the food raw material.

[23] A food additive comprising a fat and/or oil composition comprising:

65 to 99% by mass of a XXX triglyceride having fatty acid residues X, each with x carbon atoms, at positions 1 to 3; and 35 to 1% by mass of one or more types of X2Y triglycerides each having a fatty acid residue Y with y carbon atoms in place of one of the fatty acid residues X of the XXX triglyceride, provided that a total triglyceride content is 100% by mass, wherein x number of carbon atoms is an integer selected from 8 to 20, and y number of carbon atoms is an integer selected from x+2 to x+12 independently from the other y and satisfying y≤22.

Advantageous Effects of Invention

The present invention makes it possible to provide a fat and/or oil composition containing 65 to 99% by mass of only one type or at least two types of XXX triglycerides having fatty acid residues X, each with a specific number of carbon atoms, at positions 1 to 3, and 35 to 1% by mass of one or more types of X2Y triglycerides each having a fatty acid residue Y with a specific number of carbon atoms in place of one of the fatty acid residues X of the XXX triglyceride. Moreover, cooling the fat and/or oil composition from a molten state (the triglycerides are melted in this state) makes it possible to provide a fat and/or oil composition in a powder form (powdered fat and/or oil composition).

Further, the present invention makes it possible to provide a food by adding such a fat and/or oil composition obtained as described above to a food raw material.

According to the present invention, a powdered fat and/or oil composition can be obtained by: mixing a XXX triglyceride having fatty acid residues X, each with x carbon atoms, at positions 1 to 3 and a YYY triglyceride having fatty acid residues Y, each with y carbon atoms, at positions 1 to 3 at a specific mass ratio; interesterifying the mixture; and cooling the resulting product.

The method for producing a powdered fat and/or oil composition of the present invention makes it possible to obtain a powdered fat and/or oil composition substantially constituted only of a fat and/or oil.

DESCRIPTION OF EMBODIMENTS

<Fat and/or Oil Composition>

Figure 1:
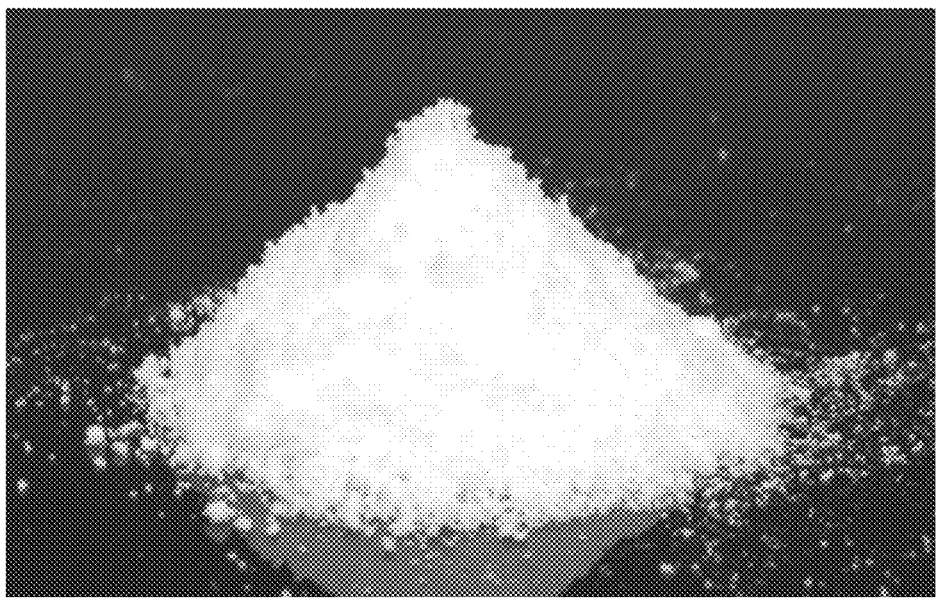
FIG. 1 is a photograph of an appearance of a powdered fat and/or oil composition of Example 11 of the present invention.
Figure 2:
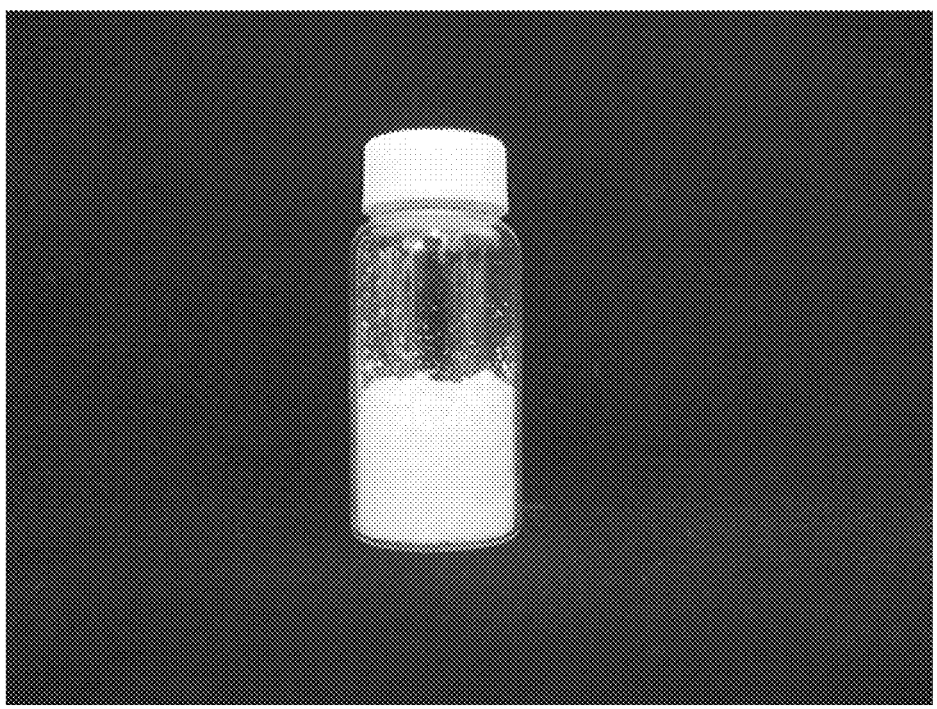
FIG. 2 is a photograph of an appearance of the powdered fat and/or oil composition of Example 11 of the present invention.
Figure 3:
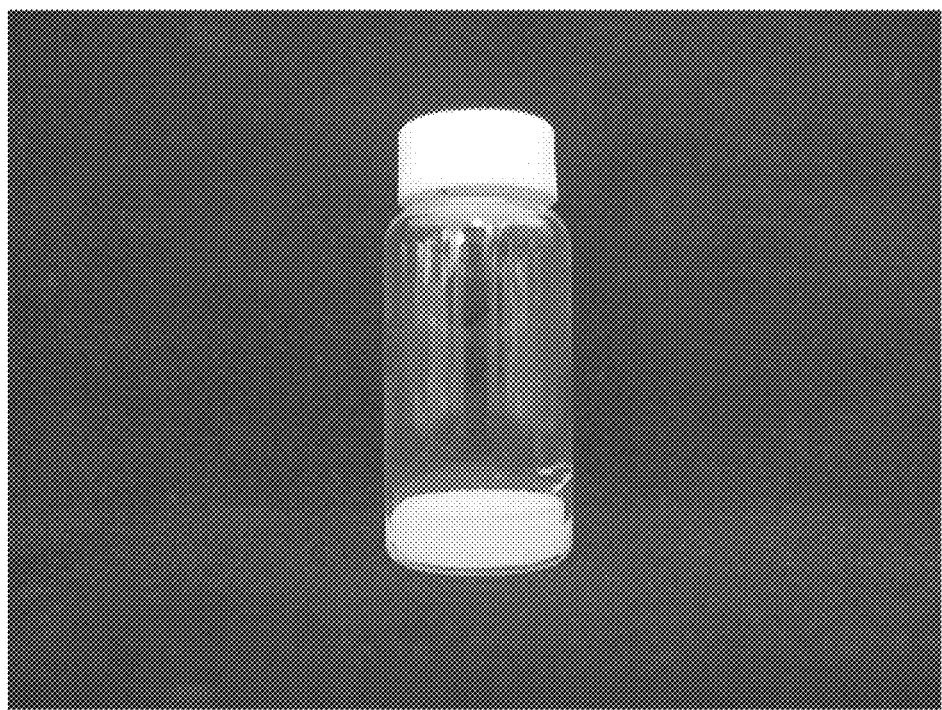
FIG. 3 is a photograph of an appearance of a fat and/or oil composition of Comparative Example 1 of the present invention.

The present invention relates to a fat and/or oil composition containing: 65 to 99% by mass of at least one type of a XXX triglyceride having fatty acid residues X, each with x carbon atoms, at positions 1 to 3; and 35 to 1% by mass of one or more types of X2Y triglycerides each having a fatty acid residue Y with y carbon atoms in place of one of the fatty acid residues X of the XXX triglyceride, provided that a total triglyceride content is 100% by mass. In the fat and/or oil composition, x number of carbon atoms is an integer selected from 8 to 20, and y number of carbon atoms is an integer selected from x+2 to x+12 independently from the other y and selected from a condition satisfying y≤22. The fat and/or oil composition containing the two types of the triglycerides in the above-described % by mass is a fat and/or oil composition in a powder form without incorporating an additive such as an emulsifier or an excipient. Hereinafter, the fat and/or oil composition of the present invention will be described in detail.

<XXX Triglyceride>

The fat and/or oil composition of the present invention contains a single type or multiple types, preferably a single type (one type), of the XXX triglyceride whose content is 65 to 99% by mass provided that a total triglyceride content is 100% by mass. The XXX triglyceride is a triglyceride having fatty acid residues X, each with x carbon atoms, at positions 1 to 3, and each of the fatty acid residues X is the same as the others. Herein, x number of carbon atoms is an integer selected from 8 to 20, preferably an integer selected from 10 to 18, more preferably an integer selected from 10 to 16, and furthermore preferably an integer selected from 10 to 12.

The fatty acid residues X may be saturated or unsaturated fatty acid residues. Specific examples of the fatty acid residues X includes residues such as caprylic acid, capric acid, lauric acid, myristic acid, palmitic acid, stearic acid, and arachidic acid, but are not limited thereto. The fatty acids are more preferably capric acid, lauric acid, myristic acid, palmitic acid, and stearic acid, furthermore preferably capric acid, lauric acid, myristic acid, and palmitic acid, and still furthermore preferably capric acid and lauric acid.

The content of the XXX triglyceride is 65 to 99% by mass relative to 100% by mass of all triglycerides in the fat and/or oil composition. The content of the XXX triglyceride is preferably 75 to 99% by mass, more preferably 80 to 99% by mass, furthermore preferably 83 to 98% by mass, particularly preferably 85 to 98% by mass, and still furthermore preferably 90 to 98% by mass.

<X2Y Triglyceride>

The fat and/or oil composition of the present invention contains one or more types of the X2Y triglycerides each having a fatty acid residue Y with y carbon atoms in place of one of the fatty acid residues X of the XXX triglyceride. Herein, each of the fatty acid residues X contained in one X2Y triglyceride is the same as the other, and is also the same as the fatty acid residues X of the XXX triglyceride. The y number of carbon atoms of the fatty acid residue Y contained in the one X2Y triglyceride is an integer selected from x+2 to x+12 under a condition satisfying y≤22. The y number of carbon atoms is an integer selected from a condition preferably satisfying y=x+2 to x+10, more preferably satisfying y=x+4 to x+8. Moreover, the upper limit value of the y number of carbon atoms is preferably y≤20, more preferably y≤18. The fat and/or oil composition of the present invention may contain multiple, for example, two types to five types, preferably three or four types, of the X2Y triglycerides. In such cases, the definition of each of the X2Y triglycerides is as described above. The y number of carbon atoms of the fatty acid residue Y of each X2Y triglyceride is selected within the above-described range independently from the other X2Y triglyceride. For example, as in Example 11 to be described later, in a case where the fat and/or oil composition of the present invention is produced by inter-esterifying tricaprin and a highly hydrogenated oil of palm kernel stearin, the composition contains four types of the X2Y triglycerides in which all the x's satisfy x=10, while y's satisfy y=12, 14, 16, and 18, respectively.

The fatty acid residue Y may be a saturated or unsaturated fatty acid residue. Specific examples of the fatty acid residue Y include residues such as lauric acid, myristic acid, palmitic acid, stearic acid, arachidic acid, and behenic acid, but are not limited thereto. The fatty acid is more preferably myristic acid, palmitic acid, stearic acid, arachidic acid, and behenic acid, and furthermore preferably myristic acid, palmitic acid, and stearic acid. The fatty acid residue Y of the X2Y triglyceride may be located at any one of positions 1 to 3 thereof.

The content of the X2Y triglycerides is 35 to 1% by mass relative to 100% by mass of all the triglycerides in the fat and/or oil composition. The content of the X2Y triglycerides is, for example, 25 to 1% by mass, preferably 20 to 1% by mass, more preferably 17 to 1% by mass, furthermore preferably 15 to 2% by mass, and still furthermore preferably 10 to 2% by mass. In the case where the fat and/or oil composition of the present invention contains multiple X2Y triglycerides, the amount of the X2Y triglycerides above is a total amount of the X2Y triglycerides contained.

<Other Triglycerides>

The fat and/or oil composition of the present invention may contain other triglycerides than the above-described XXX triglyceride and X2Y triglycerides, as long as the effects of the present invention are not impaired. The other triglycerides may be multiple types of triglycerides, or may be synthetic fats and/or oils or natural fats and/or oils. The synthetic fats and/or oils include glyceryl tricaprylate, glyceryltricaprate, and the like. Examples of the natural fats and/or oils include cocoa butter, sunflower seed oil, rapeseed oil, soybean oil, cottonseed oil, and the like. The other triglycerides may be contained in an amount of 1% by mass or more, for example, approximately 5 to 30% by mass, relative to 100% by mass of all the triglycerides in the fat and/or oil composition of the present invention without problems. The content of the other triglycerides is, for example, 0 to 30% by mass, preferably 0 to 18% by mass, more preferably 0 to 15% by mass, and furthermore preferably 0 to 8% by mass.

<Other Ingredients>

The fat and/or oil composition of the present invention may optionally contain other ingredients, such as an emulsifier, a flavor, a skim milk powder, a whole milk powder, a cocoa powder, sugar, and dextrin, than the above-described triglycerides. The amount of these other ingredients can be any amount, as long as the effects of the present invention are not impaired. Nevertheless, the amount is 0 to 70% by mass, preferably 0 to 65% by mass, and more preferably 0 to 30% by mass, provided that a total mass of the fat and/or oil composition is 100% by mass, for example. Preferably, 90% by mass or more of the other ingredients are a powder having an average particle diameter of 1000 μm or less, and more preferably a powder having an average particle diameter of 500 μm or less. Note that the term average particle diameter herein is a value measured according to laser diffraction/scattering methods (ISO133201 and ISO9276-1).

Nevertheless, a preferable fat and/or oil composition of the present invention is preferably substantially constituted only of a fat and/or oil. Herein, the term fat and/or oil is substantially constituted only of triglycerides. Moreover, the term "substantially" means that the content of an ingredient(s) other than the fat and/or oil incorporated in the fat and/or oil composition or of an ingredient(s) other than the triglycerides incorporated in the fat and/or oil is, for example, 0 to 15% by mass, preferably 0 to 10% by mass, and more preferably 0 to 5% by mass, relative to 100% by mass of the fat and/or oil composition or the fat and/or oil.

<Powdered Fat and/or Oil Composition>

A powdered fat and/or oil composition of the present invention can be obtained by melting the triglycerides incorporated in the above-described fat and/or oil composition to obtain the fat and/or oil composition in a molten state, and cooling this fat and/or oil composition, so that a fat and/or oil composition in a powder form (powdered fat and/or oil composition) is obtained without adopting dedicated processing means such as spraying and mechanical pulverization with a pulverizer such as a mill. More specifically, the fat and/or oil composition containing the XXX triglyceride and the X2Y triglycerides is optionally heated and melted, and a fat and/or oil composition in a molten state thus obtained is then cooled to form a porous solid having a larger volume than the fat and/or oil composition in the molten state. The obtained solid is pulverized (loosened) by adding a light impact from the outside, for example, by sieving. In this manner, a powdered fat and/or oil composition can be obtained easily.

Although not bound by any theory, the reason that a powdered fat and/or oil composition can be produced by such simple steps is as follows. In a case of using only a XXX triglyceride having uniform chain lengths, the fat and/or oil crystals are very densely packed and become continuous, so that the crystals are formed while keeping the dense state. In contrast, if a small amount of a X2Y triglyceride having one fatty acid with a longer chain length is present, the X2Y triglyceride enters fat and/or oil crystals containing a XXX triglyceride when cooled and crystallized from a molten state. This interrupts the continuous crystal growth of the XXX triglyceride. As a result, a solid crystallized in a very sparse state (having the volume increased with pores) is presumably formed. The obtained solid is an aggregate formed of the powdered fat and/or oil composition crystallized in a very sparse state, readily crumbles even by alight impact, and is likely to have a powder form.

<Properties of Powdered Fat and/or Oil Composition>

The powdered fat and/or oil composition of the present invention is a powdered solid at room temperature (20° C.)

The powdered fat and/or oil composition of the present invention, for example, if substantially constituted only of a fat and/or oil, has a loose bulk density of 0.1 to 0.6 g/cm$^3$, preferably 0.15 to 0.5 g/cm$^3$, and more preferably 0.2 to 0.4 g/cm$^3$. Herein, a "loose bulk density" refers to a packing density determined by letting a powder naturally fall. A loose bulk density (g/cm$^3$) is measured, for example, by: letting an appropriate amount of a powdered fat and/or oil composition fall approximately 2 cm above an upper opening end of a graduated cylinder with an inner diameter 15 mm×25 mL to loosely fill the graduated cylinder; measuring a mass (g) and reading a volume (mL) thus filled; and calculating a mass (g) of the powdered fat and/or oil composition per mL to determine the loose bulk density. Alternatively, a loose bulk density can also be calculated from a bulk specific gravity measured based on JIS K-6720 (or ISO 1060-1 and 2) by using a bulk specific gravity measuring device manufactured by Kuramochi KagakuKikai Seisakusho Co. Specifically, 120 mL of a sample is let fall toward a receiver (a 100-mL cylindrical container with an inner diameter of 40 mm×a height of 85 mm) from a height position 38 mm above an upper opening of the receiver. The sample protruding from the receiver is slid off, and a mass (A g) of the sample corresponding to the internal capacity (100 mL) of the receiver is weighed, so that a loose bulk density can be determined from the following formula.

Loose bulk density (g/mL)=$A$ (g)/100 (mL)

The measurement is preferably performed three times to obtain the average.

Moreover, the powdered fat and/or oil composition of the present invention is normally in a plate-like crystal or spherical crystal form, and preferably in a plate-like crystal form. For example, the powdered fat and/or oil composition of the present invention has an average particle diameter (effective diameter) of 50 to 400 μm, preferably 50 to 300 μm, more preferably 50 to 250 μm, and still furthermore preferably 100 to 200 μm. Herein, the average particle diameter (effective diameter) can be determined based on laser diffraction/scattering methods (ISO133201, ISO9276-1) using a particle size distribution measuring apparatus (for example, Microtrac MT3300ExII manufactured by Nikkiso Co., Ltd.). An effective diameter means a spherical particle diameter when a measured diffraction pattern of a measurement-target crystal fits to a theoretical diffraction pattern obtained under an assumption that the measurement target is spherical. In this manner, in the laser diffraction/scattering methods, an effective diameter is calculated by fitting a measured diffraction pattern to a theoretical diffraction pattern obtained under the assumption the measurement target is spherical. For this reason, even when a measurement target is a plate-like crystal or a spherical crystal, the measurement can be performed according to the same principle. Herein, the term spherical indicates that the aspect ratio is 1.0 or more but less than 1.1, while the term plate-like indicates that the aspect ratio is 1.1 or more. Note that the aspect ratio is defined as a ratio of the length of a longer side to the length of a shorter side of a rectangle which is circumscribed about a particle representation in such a manner that the area is minimum.

<Method for Producing Powdered Fat and/or Oil Composition>

The powdered fat and/or oil composition of the present invention can be produced by a method including the following steps of:

(a) preparing a fat and/or oil composition containing 65 to 99% by mass of a XXX triglyceride having fatty acid residues X, each with x carbon atoms, at positions 1 to 3, and 35 to 1% by mass of X2Y triglycerides each having a fatty acid residue Y with y carbon atoms in place of one of the fatty acid residues X of the XXX triglyceride, provided that a total triglyceride content is 100% by mass, where x number of carbon atoms is an integer selected from 8 to 20, and y number of carbon atoms is an integer selected from x+2 to x+12 independently from the other y and satisfying y≤22;

(b) optionally heating the fat and/or oil composition to melt the triglycerides incorporated in the fat and/or oil composition, thereby obtaining the fat and/or oil composition in the molten state; and (d) cooling the fat and/or oil composition in the molten state to obtain a powdered fat and/or oil composition.

Additionally, the method may include, as step (c), an optional step(s) for promoting the powder formation, for example, a seeding step (c1), a tempering step (c2), and/or a pre-cooling step (c3), between steps (b) and (d). Further, the powdered fat and/or oil composition in step (d) may be a fat and/or oil composition in a powder form obtained by step (e) of pulverizing a solid obtained after the cooling in step (d). Hereinafter, steps (a) to (e) will be described.

(a) Fat and/or Oil Composition Preparation Step I

The fat and/or oil composition prepared in step (a) contains a XXX triglyceride (at least one type) and a X2Y triglyceride (at least one type) in the above-described % by mass. Specifically, for example, the fat and/or oil composition is obtained through steps of: separately preparing and mixing a XXX triglyceride (at least one type) having fatty acid residues X, each with x carbon atoms, at positions 1 to 3 and a YYY triglyceride (at least one type) having fatty acid residues Y, each with y carbon atoms, at positions 1 to 3 at a mass ratio of XXX triglyceride/YYY triglyceride being 90/10 to 99/1 to obtain a reaction substrate (herein, x number of carbon atoms is an integer selected from 8 to 20, and y number of carbon atoms is an integer selected from x+2 to x+12 and satisfying y≤22); and heating the reaction substrate, followed by an interesterification in the presence of a catalyst.

<Reaction Substrate>

First, a XXX triglyceride (at least one type) and a YYY triglyceride (at least one type) are mixed to obtain a reaction substrate. Herein, the details of the XXX triglyceride are as described above.

The YYY triglyceride is a triglyceride having fatty acid residues Y, each with y carbon atoms, at positions 1 to 3. Herein, y number of carbon atoms and the fatty acid residues Y are as described above.

The XXX triglyceride and the YYY triglyceride can also be obtained through direct synthesis using fatty acids or fatty acid derivatives and glycerin. In the case of the XXX triglyceride, the method for directly synthesizing the XXX triglyceride includes: (i) a method in which fatty acids each with x carbon atoms and glycerin are directly esterified (direct esterification); (ii) a method in which a fatty acid alkyl ester (for example, fatty acid methyl ester and fatty acid ethyl ester) having an alkoxy group bonded to a carboxyl group of a fatty acid X with x carbon atoms is reacted with glycerin under a base or acid catalyst condition (transesterification synthesis using a fatty acid alkyl ester); and (iii) a method in which a fatty acid halide (for example, fatty acid chloride and fatty acid bromide) having a halogen substituting for a hydroxyl group of a carboxyl group of a fatty acid X with x carbon atoms is reacted with glycerin under a base catalyst (acid halide synthesis).

The XXX triglyceride and the YYY triglyceride can be produced by any of the above-described methods (i) to (iii). Nevertheless, from the viewpoint of the ease of the production, the direct esterification (i) or the transesterification synthesis (ii) using a fatty acid alkyl ester is preferable, and the direct esterification (i) is more preferable.

To produce the XXX triglyceride or the YYY triglyceride by the direct esterification (i), preferably 3 to 5 moles, more preferably 3 to 4 moles, of the fatty acid X or the fatty acid Y is used relative to 1 mole of glycerin from the viewpoint of the production efficiency.

The reaction temperature in the direct esterification (i) for the XXX triglyceride or the YYY triglyceride should be a temperature at which water formed by the esterification can be removed to the outside of the system. For example, the reaction temperature is preferably 120° C. to 300° C., more preferably 150° C. to 270° C., and furthermore preferably 180° C. to 250° C. When the reaction is carried out at 180 to 250° C., the XXX triglyceride or the YYY triglyceride can be produced particularly efficiently.

In the direct esterification (i) for the XXX triglyceride or the YYY triglyceride, a catalyst may be used to promote the esterification. The catalyst includes acid catalysts, alkaline earth metal alkoxides, and the like. The amount of the catalyst used is preferably approximately 0.001 to 1% by mass relative to a total mass of the reaction raw materials.

In the direct esterification (i) for the XXX triglyceride or the YYY triglyceride, the catalyst and unreacted raw materials can be removed by a known purification treatment such as water washing, alkaline neutralization (deacidification) and/or distillative neutralization under reduced pressure, and adsorption treatment after the reaction. Further, the obtained product can be further purified by bleaching (decolorization) and deodorization treatments.

These XXX triglyceride and YYY triglyceride are mixed at a mass ratio of XXX triglyceride/YYY triglyceride being 90/10 to 99/1, preferably 93/7 to 99/1, more preferably 95/5 to 99/1. Particularly, in the case where the fatty acid residues X each have 10 carbon atoms while the fatty acid residues Y each have 14 to 18 carbon atoms, the mass ratio of XXX triglyceride/YYY triglyceride is preferably 95/5 to 99/1. Moreover, in the case where the fatty acid residues X each have 12 carbon atoms while the fatty acid residues Y each have 16 to 18 carbon atoms, the mass ratio of XXX triglyceride/YYY triglyceride is preferably 95/5 to 99/1.

<Other Triglycerides>

Various triglycerides may be incorporated as raw-material triglycerides of the reaction substrate in addition to the XXX triglyceride and the YYY triglyceride, as long as the effects of the present invention are not impaired. Examples of the other triglycerides include: X2Y triglycerides each having a fatty acid residue Y in place of one of the fatty acid residues X of the XXX triglyceride; XY2 triglycerides each having fatty acid residues Y in place of two of the fatty acid residues X of the XXX triglyceride; and the like.

The amount of the other triglycerides is 0 to 15% by mass, preferably 0 to 7% by mass, and more preferably 0 to 4% by mass, provided that a total mass of the XXX triglyceride and the YYY triglyceride is 100% by mass, for example.

Meanwhile, instead of the XXX triglyceride and the YYY triglyceride, a naturally-derived triglyceride composition may be used. Examples of the naturally-derived triglyceride composition include palm kernel oil, palm kernel olein, palm kernel stearin, rapeseed oil, coconut oil, soybean oil, sunflower seed oil, safflower oil, palm stearin, and the like. These naturally-derived triglyceride compositions may be: a hydrogenated oil further modified by hydrogenation or the like; a partially hydrogenated oil; or a highly hydrogenated oil.

The amount of the naturally-derived triglyceride composition depends on the amount of a necessary XXX triglyceride or YYY triglyceride incorporated in such naturally-derived triglyceride compositions. Nevertheless, for example, in a case where X in the XXX triglyceride is capric acid while a highly hydrogenated oil of palm kernel stearin is used as the source of the YYY triglyceride, it is appropriate to incorporate the naturally-derived triglyceride composition in such an amount that a triglyceride having Y residues at positions 1 to 3, which is contained in the highly hydrogenated oil of palm kernel stearin, is required as the above-described YYY triglyceride, that is, an amount satisfying that the mass ratio of XXX triglyceride/YYY triglyceride is 90/10 to 99/1, preferably 93/7 to 99/1, and more preferably 95/5 to 98/2.

<Other Ingredients>

As raw materials constituting the reaction substrate, other ingredients such as a partial glyceride, an antioxidant, an emulsifier, and a solvent such as water may be optionally incorporated in addition to the above-described triglycerides. The amount of these other ingredients can be any amount, as long as the effects of the present invention are not impaired. Nevertheless, for example, provided that the mass of the reaction substrate to be obtained is 100% by mass, the amount is 0 to 5% by mass, preferably 0 to 2% by mass, and more preferably 0 to 1% by mass.

The mixing may be performed by adopting any known mixing method, as long as a uniform reaction substrate is obtained. Nevertheless, the mixing can be performed, for example, with a paddle mixer, an agi-homo mixer, a disper mixer, or the like.

The mixing may be performed under heating as necessary. The heating is preferably performed at a heating temperature comparable to that instep (b) to be described later, for example, 50 to 120° C., preferably 60 to 100° C., more preferably 70 to 90° C., and furthermore preferably 80° C. Note that in a case where an enzyme is added as the catalyst, it is preferable that water be present as little as possible before the enzyme is added. The amount of the water before the enzyme addition is appropriately, for example, 10% by mass or less, preferably 0.001 to 5% by mass, more preferably 0.01 to 3% by mass, and furthermore preferably 0.01 to 2% by mass, relative to a total mass of the raw materials. This mixing may be continued for, for example, 5 to 60 minutes, preferably 10 to 50 minutes, and more preferably 20 to 40 minutes.

<Interesterification>

The reaction substrate (the mixture containing the XXX triglyceride and the YYY triglyceride) is heated for the interesterification in the presence of a catalyst. Thus, an interesterified product (a fat and/or oil composition containing the XXX triglyceride and the X2Y triglyceride) is obtained.

The interesterification is not particularly limited. Normally-adopted interesterifications can be employed.

Here, the heating is performed at, for example, 50 to 120° C., preferably 60 to 100° C., more preferably 70 to 90° C., and furthermore preferably 80° C.

As the catalyst, it is possible to use an enzyme, an alkali metal alkoxide, an alkaline earth metal alkoxide, or the like. As the enzyme, an immobilized enzyme and a powdered enzyme can be used. A powdered enzyme is preferable from the viewpoint of the enzyme activity and the ease of handling.

The powdered enzyme is a powder obtained by drying an enzyme-containing aqueous liquid by a method such as spray drying, freeze drying, or drying after solvent precipitation. The powdered enzyme is not particularly limited. An example thereof includes a lipase derived from *Alcaligenes* sp. (Meito Sangyo Co. Ltd., product name: Lipase QLM).

As the immobilized enzyme, it is possible to use an enzyme immobilized on a support such as silica, Celite, diatomaceous earth, perlite, polyvinyl alcohol, anion exchange resin, phenol adsorption resin, hydrophobic support, cation exchange resin, or chelating resin.

In the alkali metal alkoxide and the alkaline earth metal alkoxide usable as the catalyst, lithium, sodium, potassium, and the like can be preferably used as an alkali metal; meanwhile, magnesium and calcium can be preferably used as an alkaline earth metal. The alkoxide includes methoxide, ethoxide, propoxide, n-butoxide, t-butoxide, and the like. Preferable are methoxide and ethoxide. Preferable alkali metal alkoxides and alkaline earth metal alkoxides include sodium methoxide, sodium ethoxide, magnesium methoxide, magnesium ethoxide, and the like. More preferable is sodium methoxide.

One or a mixture of at least two of these catalysts may be used. Nevertheless, it is preferable not to use an enzymatic catalyst and an alkoxide-based catalyst simultaneously.

The amount of the catalyst should be an amount allowing the interesterification to sufficiently proceed. Relative to the total mass of the raw-material triglycerides, the catalyst is added in an amount of, for example, 0.01 to 20% by mass, preferably 0.05 to 10o by mass, more preferably 0.1 to 5% by mass, and furthermore preferably 0.2 to 1% by mass. Besides the catalyst, a co-catalyst may be used optionally.

The interesterification is carried out, for example, at normal pressure or reduced pressure at the above-described heating temperature for, for example, 0.5 to 50 hours, preferably 1 to 40 hours, more preferably 5 to 30 hours, and furthermore preferably 10 to 20 hours, optionally with stirring. Moreover, in this reaction step, for example, the above-described predetermined amount of the catalyst may be introduced at once, or the predetermined amount of the catalyst maybe introduced in a divided manner 2 to 30 times, preferably 3 to 20 times, and more preferably 5 to 15 times. Regarding the timing of introducing the catalyst, the catalyst may be introduced every 1 to 2 hours after the first catalyst introduction, in addition to immediately after step (a).

(a) Fat and/or Oil Composition Preparation Step II

The method for producing the fat and/or oil composition prepared in step (a) of the present invention further includes a method in which a XXX triglyceride and a X2Y triglyceride are simultaneously and directly synthesized as described below. Specifically, to obtain a XXX triglyceride and a X2Y triglyceride in this preparation step II, a XXX triglyceride and a YYY triglyceride are not separately synthesized for the interesterification, but raw materials (fatty acids or fatty acid derivatives and glycerin) for producing both of the triglycerides are introduced into, for example, a single reaction vessel to simultaneously and directly synthesize the triglycerides. The production method includes any of the following methods:

(iv) a method in which fatty acids X each with x carbon atoms, fatty acids Y each with y carbon chains, and glycerin are directly esterified (direct esterification); (v) a method in which fatty acid alkyl esters (for example, fatty acid methyl esters and fatty acid ethyl esters) having alkoxy groups bonded to carboxyl groups of a fatty acid X with x carbon atoms and a fatty acid Y with y carbon chains are reacted with glycerin under a base or acid catalyst condition (transesterification synthesis using fatty acid alkyl esters); and (vi) a method in which fatty acid halides (for example, fatty acid chlorides and fatty acid bromides) having halogens substituting for hydroxyl groups of carboxyl groups of a fatty acid X with x carbon atoms and a fatty acid Y with y carbon chains are reacted with glycerin under a base catalyst (acid halide synthesis).

The fat and/or oil composition of the present invention can be produced by any of the above-described methods. Nevertheless, from the viewpoint of the ease of the production, the direct esterification (iv) or the transesterification synthesis (v) using fatty acid alkyl esters is preferable, and the direct esterification (iv) is more preferable.

In the direct esterification (iv) for the fat and/or oil composition of the present invention, the production method is not limited, as long as the XXX triglyceride and the X2Y triglyceride have desired ranges of % by mass in all the triglycerides. Nevertheless, a two-step reaction is preferably carried out to reliably produce desired triglycerides in the system. Specifically, in the first step of such a preferable method, glycerin is reacted with fatty acids X each with x carbon atoms including fatty acids Y each with y carbon atoms. Then, in the second step, fatty acids X each with x carbon chains were added for the reaction. Thus, the resulting fat and/or oil composition contains predetermined amounts of the XXX triglyceride and the X2Y triglyceride.

In the first-step reaction when the two-step reaction is carried out, a total molar amount of the fatty acids Y and the fatty acids X is adjusted such that the X2Y triglyceride has a desired range of % by mass in all the glycerides. The total molar amount is preferably 0.5 to 2.8 moles, more preferably 0.8 to 2.57 moles, and the most preferably 1.1 to 2.2 moles, relative to 1 mole of glycerin. This enables a reliable esterification with glycerin by fully using the fatty acids Y and consequently more reliable X2Y glyceride production in the system.

The reaction temperature in the direct esterification for the fat and/or oil composition of the present invention should be a temperature at which water formed by the esterification can be removed to the outside of the system. The reaction temperature is preferably 120° C. to 300° C., more preferably 150° C. to 270° C., and furthermore preferably 180° C. to 250° C. Particularly, when the reaction is carried out at 180 to 250° C., the X2Y triglyceride can be produced efficiently.

In the direct esterification (iv) for the fat and/or oil composition of the present invention, a catalyst may be used to promote the esterification. The catalyst includes acid catalysts, alkaline earth metal alkoxides, and the like. The amount of the catalyst used is preferably approximately 0.001 to 1% by mass relative to a total mass of the reaction raw materials.

In the direct esterification (iv) for the fat and/or oil composition of the present invention, the catalyst and unreacted raw materials can be removed by a known purification treatment such as water washing, alkaline neutralization and/or distillative neutralization under reduced pressure, and adsorption treatment after the reaction. Further, the obtained product can be further purified by bleaching and deodorization treatments.

(a) Fat and/or Oil Composition Preparation Step III

Further, the fat and/or oil composition may be obtained as the fat and/or oil composition containing 65 to 99% by mass of the XXX triglyceride and 35 to 1% by mass of the X2Y triglyceride by: preparing a fat and/or oil composition containing the XXX triglyceride outside the range of 65 to 99% by mass and/or the X2Y triglyceride outside the range of 35 to 1% by mass; and then further adding the XXX triglyceride or the X2Y triglyceride (preparation of the fat and/or oil composition by dilution). For example, after a fat and/or oil composition containing 50 to 70% by mass of the XXX triglyceride and 50 to 30% by mass of the X2Y triglyceride is obtained, a desired amount of the XXX triglyceride may be added to obtain the fat and/or oil composition containing 65 to 99% by mass of the XXX triglyceride and 35 to 1% by mass of the X2Y triglyceride.

Furthermore, the preparation step III also includes adjusting the % by mass of the XXX triglyceride and the X2Y triglyceride within more preferable ranges by: first preparing a fat and/or oil composition containing the XXX triglyceride within the range of 65 to 99% by mass and/or the X2Y triglyceride within the range of 35 to 1% by mass by the preparation step I or II; and then further adding the XXX triglyceride or the X2Y triglyceride (further favorable preparation of the fat and/or oil composition by dilution).

(b) Step of Obtaining the Fat and/or Oil Composition in Molten State

Before step (d), if the fat and/or oil composition obtained in step (a) is in a molten state when prepared, the fat and/or oil composition is directly cooled without heating. Meanwhile, if the fat and/or oil composition is not in a molten state when obtained, the fat and/or oil composition is optionally heated to melt the triglycerides incorporated in the fat and/or oil composition, so that the fat and/or oil composition in the molten state is obtained.

Herein, it is appropriate to heat the fat and/or oil composition at a temperature not lower than melting points of the triglycerides incorporated in the fat and/or oil composition, particularly at a temperature at which the XXX triglyceride and the X2Y triglyceride can be melted, for example, 70 to 200° C., preferably 75 to 150° C., and more preferably 80 to 100° C. Moreover, it is appropriate to continue the heating for, example, 0.5 to 3 hours, preferably 0.5 to 2 hours, and more preferably 0.5 to 1 hour.

(d) Step of Cooling Fat and/or Oil Composition in Molten State to Obtain Powdered Fat and/or Oil Composition Further, the fat and/or oil composition in the molten state obtained in step (a) or (b) is cooled to form a powdered fat and/or oil composition.

Herein, "cooling the fat and/or oil composition in the molten state" and similar phrases mean keeping the fat and/or oil composition in the molten state at a temperature lower than the melting point of the fat and/or oil composition. The "temperature lower than the melting point of the fat and/or oil composition" is, for example, a temperature lower by 1 to 30° C. than the melting point, preferably a temperature lower by 1 to 20° C. than the melting point, and more preferably a temperature lower by 1 to 15° C. than the melting point. The cooling of the fat and/or oil composition in the molten state is performed, for example, when x is 8 to 10, such that the cooling makes at the final temperature reach a temperature of preferably 10 to 30° C., more preferably 15 to 25° C., and furthermore preferably 18 to 22° C. The final temperature in the cooling is, for example, when x is 11 or 12, preferably 30 to 40° C., more preferably 32 to 38° C., and furthermore preferably 33 to 37° C.; when x is 13 or 14, preferably 40 to 50° C., more preferably 42 to 48° C., and furthermore preferably 44 to 47° C.; when x is 15 or 16, preferably to 60° C., more preferably 52 to 58° C., and furthermore preferably 54 to 57° C.; when x is 17 or 18, preferably 60 to 70° C., more preferably 62 to 68° C., and furthermore preferably 64 to 67° C.; when x is 19 or 20, preferably 70 to 80° C., more preferably 72 to 78° C., and furthermore preferably 74 to 77° C. At the above-described final temperatures, it is appropriate to leave standing the fat and/or oil composition in the molten state for, for example, preferably 2 hours or longer, more preferably 4 hours or longer, and furthermore preferably 6 hours to 2 days. In some cases, for example, if it takes time for powdering relatively as in a case where x number of carbon atoms of the fatty acid residues X of the XXX triglyceride is 8 to 12, particularly in a case where the following step (c) is not adopted, the fat and/or oil composition in the molten state may have to be left standing for, for example, 2 to 8 days, specifically 3 to 7 days, and more specifically approximately 6 days.

(c) Step of Promoting Powder Formation

Further, as the optional step(s) (c) for promoting the powder formation between steps (a) or (b) and (d), the fat and/or oil composition in the molten state to be used in step (d) may be treated by a seeding process (c1), a tempering process (c2) and/or a pre-cooling process (c3). These optional steps (c1) to (c3) may be performed alone or in some combination of the multiple processes. Herein, between step (a) or (b) and step (d) and similar phrases mean to include: during step (a) or (b); after step (a) or (b) but before step (d); and during step (d).

The seeding process (c1) and the tempering process (c2) in the production of the powdered fat and/or oil composition of the present invention are powder-formation promoting methods for processing the fat and/or oil composition in the molten state before the cooling to the final temperature so that the fat and/or oil composition in the molten state can be powdered more reliably.

Herein, the seeding process is a method for promoting powdering by adding a small amount of an ingredient, which serves as a powder core (seed), during the cooling of the fat and/or oil composition in the molten state. Specifically, for example, targeting the fat and/or oil composition in the molten state obtained in step (b), a fat and/or oil powder containing preferably 80% by mass or more, more preferably 90% by mass or more, of a XXX triglyceride with the same number of carbon atoms as the XXX triglyceride in the fat and/or oil composition is prepared as the ingredient which serves as the core (seed). This fat and/or oil powder serving as the core is added in an amount of 0.1 to 1 part by mass, preferably 0.2 to 0.8 parts by mass, to 100 parts by mass of the fat and/or oil composition in the molten state when the temperature of the fat and/or oil composition reaches a temperature of, for example, the final cooling temperature ±0 to +10° C., preferably +5 to +10° C., during the cooling of the fat and/or oil composition in the molten state. In this manner, this method promotes powdering of the fat and/or oil composition.

The tempering process is a method for promoting powdering of the fat and/or oil composition by one-time cooling before the fat and/or oil composition in the molten state is left standing at the final cooling temperature in cooling the fat and/or oil composition. In this process, the fat and/or oil composition in the molten state is cooled to a temperature lower than the cooling temperature in step (d), for example, a temperature lower by 5 to 20° C., preferably a temperature lower by 7 to 15° C., and more preferably a temperature lower by approximately 10° C., for preferably 10 to 120 minutes, more preferably approximately 30 to 90 minutes.

The pre-cooling process (c3) is a method for temporarily pre-cooling, before the cooling in step (d), the fat and/or oil composition in the molten state obtained in step (a) or (b) at a temperature lower than the temperature for the molten state in step (a) or (b) but higher than the cooling temperature in step (d). The temperature higher than the cooling temperature in step (d) may be, for example, a temperature higher by 2 to 40° C. than the cooling temperature in step (d), preferably a temperature higher by 3 to 30° C., more preferably a temperature higher by 4 to 30° C., and furthermore preferably a temperature higher by approximately 5 to 10° C. Setting a lower temperature for the pre-cooling makes it possible to further shorten the cooling time at the cooling temperature in step (d). Thus, unlike the seeding process and the tempering process, the pre-cooling process is a method for allowing the promotion of powdering of the fat and/or oil composition only by decreasing the cooling temperature stepwise, and has a great advantage in industrial production.

(e) Step of Pulverizing Solid to Obtain Powdered Fat and/or Oil Composition

Step (d) of obtaining the powdered fat and/or oil composition by cooling described above may be performed, more specifically, by step (e) of pulverizing a solid resulting from the cooling in step (d) to obtain a powdered fat and/or oil composition.

The detail will be described. First, the fat and/or oil composition containing the XXX triglyceride and the X2Y triglyceride is melted, and a fat and/or oil composition is thus obtained in a molten state and then cooled to form a porous solid having a larger volume than the fat and/or oil composition in the molten state. The fat and/or oil composition in the form of porous solid can be pulverized by adding a light impact, so that the solid easily collapses into a powder form.

Herein, the means for adding a light impact is not particularly specified. Nevertheless, a pulverization (loosening) method by gently vibrating (applying an impact to) the solid by shaking, sieving, or the like is simple and preferable.

<Usage of Powdered Fat and/or Oil Composition>

The powdered fat and/or oil composition of the present invention is utilizable in various fields using powdered fats and/or oils as raw materials. Particularly, the powdered fat and/or oil composition of the present invention is utilized in the field of foods such as cake mixes, coffee creams, shortenings, and chocolates.

<Food Containing Fat and/or Oil Composition>

The fat and/or oil composition of the present invention can be incorporated in various foods. Food raw materials to which the fat and/or oil composition is added include cakes such as cake mixes as described above, coffee creams, shortenings, chocolates, breads, paste products of seafood, baked confectionery products, creams, and the like.

Incorporating the fat and/or oil composition of the present invention in a food can impart a light air-in-like mouthfeel and a good melt-in-the-mouth to, for example, a chocolate. Particularly, in the case where the food is a chocolate, a cooling sensation is imparted to the chocolate, and the resultant is highly preferable and can meet the demand of those who cannot be satisfied by conventional chocolates.

Further, the food containing the fat and/or oil composition of the present invention may be a powdered food. Examples of the powdered food include powdered chocolates, powdered dressings, cake mixes, bread mixes, and the like. Incorporating the fat and/or oil composition of the present invention in a powdered food, for example, a powdered chocolate, makes it possible to provide a delicious powdered chocolate having a less oily taste and easy to eat. Particularly, in the case where the powdered food is a powdered chocolate, a unique cooling sensation is imparted, making it possible to provide a highly preferable powdered chocolate.

Moreover, the food may be what is called a "ketogenic diet." A "ketogenic diet" is referred to a high-fat and low-saccharide diet, which is utilized as a diet for treating patients requiring saccharide-restrictive diets, for example, children with epilepsy. A ketogenic diet containing the fat and/or oil composition of the present invention can be an improved diet in terms of palatability and ease of eating.

Hereinafter, a chocolate and a powdered chocolate will be described as typical foods. Hereinafter, unless otherwise particularly stated, the term "chocolate" means to include a normal chocolate and a powdered chocolate. In addition, the term "fat and/or oil composition" means the fat and/or oil composition and the powdered fat and/or oil composition of the present invention described above.

<Chocolate>

In the present invention, a "chocolate" is not limited to those specified in "Fair Competition Code concerning Labeling for Chocolates (Japan Fair Trade Commission Notification No. 16 of S46.3.29 (Mar. 29, 1971), amended Notification No. 18 of H2.6.22 (Jun. 22, 1990))" (Japan Chocolate Industry Fair Trade Conference) or in regulations, and is not particularly limited, as long as it is produced by adding, as necessary, a dairy product, a flavor, an emulsifier, or the like to main raw materials including cacao mass, a cocoa powder, edible fat and/or oil (such as cocoa butter, vegetable fat and/or oil) and a saccharide (such as sugar, lactose, maltose, fructose) and through chocolate production steps (such as a mixing step, a refining step, a conching step, a cooling step). Examples of the "chocolate" of the present invention also include a white chocolate and a color chocolate which use no cacao mass, in addition to a dark chocolate, a black chocolate, and a milk chocolate.

The "chocolate" obtained according to the present invention is preferably an air-in-like chocolate (aerated chocolate). In the present invention, an "air-in-like chocolate" means a chocolate having a light mouthfeel and a good melt-in-the-mouth resembling what is called an aerated chocolate, although the "air-in-like chocolate" is produced only by cooling and solidification without introducing air into the chocolate itself.

<Powdered Chocolate>

In the present invention, a "powdered chocolate" has a wide concept referring to all powdered products of the above-described "chocolate". Note that the term "powdered" in the "powdered chocolate" refers to having an average particle diameter of, for example, 100 μm or less. The average particle diameter is more preferably 50 μm or less, and the average particle diameter is furthermore preferably 30 μm or less. Note that the term average particle diameter herein is a value measured according to laser diffraction/scattering methods (ISO133201 and ISO9276-1).

The chocolate and the powdered chocolate of the present invention may contain a flavoring substance, a lipid, a protein, a saccharide, and other ingredients. Hereinafter, these ingredients will be described.

<Flavoring Substance That Can Be Incorporated in Chocolate>

As the "flavoring substance" as used herein, any flavoring substance can be used without particular limitations, as long as it can be powdered. Examples thereof include a cocoa powder, a matcha powder, a vanilla powder, a strawberry powder, a banana powder, a mango powder, a coffee powder, powdered milk (such as whole milk, skim milk, processed milk), a whey powder, a butter milk powder, a curry powder, and the like. One or at least two of these can be used. Particularly, in the present invention, it is preferable to use at least one flavoring substance selected from the group consisting of a cocoa powder, a matcha powder, and powdered milk.

The content of the flavoring substance in the chocolate is preferably 3 to 50% by mass, more preferably 5 to 40% by mass, and furthermore preferably 7 to 30% by mass, provided that a total mass of a finally obtained chocolate containing the fat and/or oil composition of the present invention is 100% by mass, for example.

<Lipid Incorporated in Chocolate>

The chocolate of the present invention can optionally contain another lipid in addition to the fat and/or oil composition. As the lipid, an edible fat and/or oil is particularly preferable. Examples of such an edible fat and/or oil include edible oils, margarines, fat spreads, shortenings, and the like. One or a combination of at least two of these can be used. These edible fats and/or oils are preferably processed into a powder form. As raw materials of the edible fats and/or oils, it is possible to use, for example, coconut oil, palm kernel oil, palm oil, palm fractionated oil (such as palm olein or palm super olein), shea butter, fractionated shea oil, sal fat, fractionated sal oil, illipe butter, soybean oil, rapeseed oil, cottonseed oil, safflower oil, sunflower seed oil, rice oil, corn oil, sesame oil, olive oil, milk fat, cocoa butter, or the like, a fat and/or oil mixture thereof, a processed fat and/or oil thereof, or the like.

The content of the another lipid in the chocolate is preferably 0 to 100% by mass, more preferably 0 to 75% by mass, and furthermore preferably 0 to 50% by mass, relative to 100% by mass of the fat and/or oil composition, for example. Moreover, in the case where milk fat or cocoa butter is incorporated as another lipid, the milk fat or cocoa butter is incorporated in an amount of preferably 1 to 50% by mass, more preferably 2 to 45% by mass, and furthermore preferably 3 to 40% by mass, relative to a total content of all lipids in the chocolate.

Note that, in the present invention, in a case where a ketone ratio and a ketone index to be described later are calculated, lipids derived from the raw materials other than the aforementioned lipid to be blended are also included in the calculation. For example, generally, the fat and/or oil (cocoa butter) content in cacao mass is 55% by mass, the fat and/or oil (cocoa butter) content in a cocoa powder is 11% by mass, and the fat and/or oil (milk fat) content in a whole milk powder is 25% by mass. Hence, lipids corresponding to these are incorporated into the chocolate. Moreover, in the case where a matcha powder is blended into the powdered chocolate, since the lipid content in the matcha powder is approximately 5.3% by mass, a lipid corresponding to this is incorporated into the chocolate. Further, in the case where powdered milk is blended into the chocolate, since the lipid content in the powdered milk is approximately 26.2% by mass, a lipid corresponding to this is incorporated into the chocolate.

The total content of all lipids in the chocolate is preferably 30 to 99% by mass, more preferably 40 to 95% by mass, and furthermore preferably 55 to 90% by mass, provided that the total mass of the finally obtained chocolate containing the fat and/or oil composition of the present invention is 100% by mass, for example.

<Protein Incorporated in Chocolate>

The "protein" as used herein is not particularly limited, as long as it contains a peptide larger than eight amino acids. Examples thereof includes corn glutens, wheat glutens, soybean proteins, wheat proteins, milk proteins, whey proteins, animal proteins (including collagens) obtained from edible meats or fish meats, egg whites, yolks, and the like. These proteins are preferably processed into a powder form. Particularly, when utilized as a ketogenic diet, human essential amino acids, that is, lysine, leucine, methionine, and cysteine, are preferably incorporated.

Note that, in the present invention, in the case where a ketone ratio and a ketone index to be described later are calculated, proteins derived from the raw materials other than the protein to be blended are also included in the calculation. For example, in the case where a cocoa powder is blended into the chocolate, since the protein content in the cocoa powder is approximately 20% by mass, a protein corresponding to this is incorporated into the chocolate. Moreover, in the case where a matcha powder is blended into the chocolate, since the protein content in the matcha powder is approximately 30.6% by mass, a protein corresponding to this is incorporated into the chocolate. Further, in the case where powdered milk is blended into the chocolate, since the protein content in the powdered milk is approximately 25.5% by mass, a protein corresponding to this is incorporated into the chocolate.

A total content of all proteins in the chocolate is, for example, preferably 0 to 40% by mass, more preferably 0 to 35% by mass, and furthermore preferably 0 to 25% by mass, provided that the total mass of the finally obtained chocolate containing the fat and/or oil composition of the present invention is 100% by mass.

<Saccharide Incorporated in Chocolate>

The "saccharide" as used herein is not particularly limited. Examples thereof include glucose, dextrin, lactose, sucrose (sugar), galactose, ribose, trehalose, starches, processed starches, starch syrups, lactose, glucose, fructose, maltose, hydrogenated starch saccharides, liquid sugar, enzyme-inverted syrups, isomerized liquid sugar, sucrose-coupled syrups, reducing sugar polydextrose, oligosaccharides, sorbitol, reduced lactose, xylose, xylitose, maltitol, erythritol, mannitol, raffinose, and the like. These saccharides are preferably processed into a powder form. In the present invention, to impart chocolate-like flavor and mouthfeel, sucrose (sugar) is preferably used, and powdered sugar thereof is further preferably used.

Note that, in the present invention, in the case where a ketone ratio and a ketone index to be described later are calculated, saccharides derived from the raw materials other than the saccharide to be blended are also included in the calculation. For example, in the case where a cocoa powder is blended into the chocolate, since the saccharide content in the cocoa powder is approximately 44.5% by mass, a saccharide corresponding to this is incorporated into the chocolate. Moreover, in the case where a matcha powder is blended into the chocolate, since the saccharide content in the matcha powder is approximately 38.5% by mass, a saccharide corresponding to this is incorporated into the chocolate. Further, in the case where powdered milk is blended into the chocolate, since the saccharide content in the powdered milk is approximately 39.3% by mass, a saccharide corresponding to this is incorporated into the chocolate.

A total content of all saccharides contained in the chocolate is preferably 20 to 60% by mass, more preferably 25 to 55% by mass, and furthermore preferably 30 to 50% by mass, provided that the total mass of the finally obtained chocolate containing the fat and/or oil composition of the present invention is 100% by mass, for example. Particularly, the saccharide content in a ketogenic-diet type chocolate is, for example, preferably 1 to 30% by mass, more preferably 5 to 25% by mass, and furthermore preferably 5 to 20% by mass.

<Other Ingredients Incorporated in Chocolate>

The chocolate of the present invention can optionally contain, other raw materials, which are generally used in producing chocolates, than the above-described chocolate raw materials. For example, it is possible to use an antioxidant, a preservative, a pH adjuster, a coloring agent, a sweetener, a flavor, an emulsifier, a spice, a food material such as a fruit or a vegetable, or the like. The content of these other ingredients can be any amount, as long as the effects of the present invention are not impaired. Particularly, in the present invention, in a case where the chocolate is produced at a ratio (mass ratio) of the lipid to a total of the protein and the saccharide being 2.0 or more, it is particularly preferable to use a sweetener and/or a flavor in order to restrict the amount of the saccharide used, and to improve the flavor.

<Content of Fat and/or Oil Composition>

First, the content of the fat and/or oil composition in the food of the present invention varies depending on the type of a target food. Nevertheless, the content is, for example, 0.1 to 99% by mass, preferably 1 to 90% by mass, more preferably 5 to 85% by mass, and furthermore preferably 10 to 80% by mass, relative to, for example, 100% by mass of the finally obtained food.

For example, in the case where the food of the present invention is a chocolate, the fat and/or oil composition is incorporated into the chocolate such that a ratio of the mass of the fat and/or oil composition to the mass of the cocoa butter is 40:60 to 99:1. The ratio of the mass of the fat and/or oil composition to the mass of the cocoa butter is more preferably 45:55 to 97:3, and furthermore preferably 50:50 to 95:5. Meanwhile, the powdered fat and/or oil composition of the present invention is preferably incorporated such that the content in the chocolate is 10% by mass to 60% by mass. Moreover, the content is preferably 12 to 55% by mass, and furthermore preferably 15 to 50% by mass, relative to 100% by mass of the finally obtained chocolate.

For example, in the case where the ratio of the mass of the powdered fat and/or oil composition to the mass of the cocoa butter is 40:60 (i.e., in a case where the ratio of the cocoa butter to the powdered fat and/or oil composition is high), the solidified chocolate then has a light air-in-like mouthfeel and a good melt-in-the-mouth after a while. In contrast, in the case where the ratio of the mass of the powdered fat and/or oil composition to the mass of the cocoa butter is 99:1 (in a case where the ratio of the cocoa butter to the powdered fat and/or oil composition is low), the solidified chocolate then immediately has a light air-in-like mouthfeel and a good melt-in-the-mouth. In this manner, the time to become the air-in-like state varies depending on the ratio of the cocoa butter to the powdered fat and/or oil composition. Thus, the mass ratio as described above is preferable.

Meanwhile, for example, in the case where the food of the present invention is a powdered chocolate, the fat and/or oil composition is preferably incorporated such that the content is 30 to 96% by mass relative to 100% by mass of the finally obtained powdered chocolate. Moreover, the content is preferably 40 to 90% by mass, and furthermore preferably 50 to 80% by mass. To bring about a favorable powdered chocolate flavor, it is appropriate to incorporate the above-described flavoring substance and so forth in an amount of at least 4% by mass. Hence, the upper limit of the content of the powdered fat and/or oil composition of the present invention is preferably 96% by mass. Further, a favorable powdered chocolate can be obtained with 30% by mass or more of the powdered fat and/or oil composition of the present invention.

In addition, in the case where the ratio (mass ratio) of the lipid to the total of the protein and the saccharide is 2.0 or more, the present invention can be utilized as a ketogenic diet. In this case, the fat and/or oil composition of the present invention is preferably incorporated in an amount of 50% by mass or more of the lipid. With 50% by mass or more of the fat and/or oil composition relative to the lipid, it is possible to obtain such effects as no oily taste, ease of eating, and also being delicious. The fat and/or oil composition of the present invention should be incorporated in an amount of more preferably 60% by mass or more of the lipid, and furthermore preferably 70% by mass or more of the lipid.

<Blending Ratio of Lipid, Protein, and Saccharide in Powdered Chocolate>

In the present invention, the "powdered chocolate" preferably contains, in a final product, 30 to 99% by mass of the lipid, 0 to 40% by mass of the protein, and 1 to 30% by mass of the saccharide; more preferably 40 to 95% by mass of the lipid, 0 to 35% by mass of the protein, and 5 to 25% by mass of the saccharide; and furthermore preferably 55 to 950% by mass of the lipid, 0 to 25% by mass of the protein, and 5 to 20% by mass of the saccharide. Note that these numerical values of % by mass are based on 100% by mass (dry mass) of the powdered chocolate in the final product.

<Energy of Powdered Chocolate>

The "powdered chocolate" of the present invention preferably has a relatively high energy so that a necessary energy can be conveniently provided in a large amount. Specifically, the energy thereof has 500 to 850 kilocalories per 100 g of the powdered chocolate, preferably has 600 to 800 kilocalories per 100 g of the powdered chocolate, and furthermore preferably has 700 to 800 kilocalories per 100 g of the powdered chocolate.

<Ketone Ratio of Powdered Chocolate>

To utilize the "powdered chocolate" of the present invention as a ketogenic diet, the ratio (mass ratio) of the lipid (hereinafter also referred to as "F") to the total of the protein (hereinafter also referred to as "P") and the saccharide (hereinafter also referred to as "C") (i.e., F/(P+C). Herein, this will be hereinafter referred to as "ketone ratio") is preferably 2.0 or more. Specifically, the ketone ratio is 2.0 to 6.0. Preferably, the ketone ratio is 3.0 to 5.5. Furthermore preferably, the ketone ratio is 4.0 to 5.0. Generally, the higher the ketone ratio, the more effective. Nevertheless, taking into consideration that a ketogenic diet is long continued, it is effective to start the diet with a ketone ratio of 2.0 or more. If a higher effect is desired, the ketone ratio is more preferably 3.0 or more, and furthermore preferably 4.0 or more. On the other hand, the ketone ratio of 6.0 or less is preferable because the diet can be eaten without any difficulty.

<Ketone Index of Powdered Chocolate>

By the way, in a case where the lipid content is high and the carbohydrate (saccharide) content is low, ketone bodies are consumed as energy. Hence, a lipid is called a ketogenic substance (K), whereas a carbohydrate (saccharide) is called an anti-ketogenic substance (AK) in some cases ("Book of Ketogenic Diet" written by Hiroshi Maruyama et al., Dai-Ichi Shuppan Co., Ltd., 2010, at page 4). Moreover, a lipid (fat) contains 90% by mass of K and 10% by mass of AK, while a protein contains 46% by mass of K and 58% by mass of AK (supra).

Accordingly, a ratio (mass ratio) of a ketogenic substance (K) to an anti-ketogenic substance (AK) (herein, this will be hereinafter referred to as "ketone index") calculated according to the following formula indicates an efficacy as a ketogenic diet sometimes (supra).

$$K/AK=(0.9F+0.46P)/(C+0.1F+0.58P)$$

Note that this formula is called "Woodyatt's formula."

In the present invention, the ketone index is preferably 1.0 to 4.0, more preferably 2.0 to 3.5, and furthermore preferably 2.5 to 3.5. Note that, generally, the higher the ketone index, the more effective. Nevertheless, taking into consideration that a ketogenic diet is long continued, it is effective to start the diet with a ketone index of 1.0 or more. Moreover, since it is said that ketone bodies are produced in vivo with a ketone index of more than 2.0 (supra), the ketone index is more preferably 2.0 or more, and furthermore preferably 2.5 or more. On the other hand, the ketone index of 4.0 or less is preferable because the diet can be eaten without any difficulty.

<Method for Producing Food Containing Powdered Fat and/or Oil Composition>

The present invention also relates to a method for producing a food containing the above-described powdered fat and/or oil composition.

Specifically, the method can include the above-described step of (d) cooling the fat and/or oil composition in the molten state to obtain a powdered fat and/or oil composition, or (e) pulverizing a solid to obtain a powdered fat and/or oil composition, followed by a step of adding the obtained powdered fat and/or oil composition to a food raw material, that is, (f) adding the obtained powdered fat and/or oil composition to a food raw material to obtain a food containing the powdered fat and/or oil composition.

In step (f), the adding method is not particularly limited. The powdered fat and/or oil composition is added to, for example, to a chocolate during the mixing step. In this event, from the viewpoint of the ease of the mixing, the powdered fat and/or oil composition is once dissolved and then added. Nevertheless, the fat and/or oil composition may be added in the powder form in some cases. Once dissolved, the powdered fat and/or oil composition is heated to the melting point or higher and completely dissolved for use. The mixing is preferably performed for a period during which the powdered fat and/or oil composition is made sufficiently uniform in the food. For a chocolate (other than the powdered form), food raw materials such as cocoa butter and sugar are needed to some extent. On the other hand, for a powdered chocolate, food raw materials such as a flavoring substance and a flavor are needed. Particularly, in a case where the food is intended as a ketogenic diet, since a large lipid amount and a small saccharide amount are required, a sweetener or the like is used in some cases. Those skilled in the art can easily adjust the amounts of the food raw materials added to optimal values, depending on the amount of the powdered fat and/or oil composition added.

Hereinafter, description will be given by taking a chocolate and a powdered chocolate as examples.

<Method for Producing Chocolate (Other Than Powdered Form)>

The chocolate containing the powdered fat and/or oil composition of the present invention can be produced by conventionally known methods. The chocolate of the present invention can be produced, for example, by adding the powdered fat and/or oil composition to raw materials such as a fat and/or oil, a cacao ingredient, a saccharide, a dairy product, and an emulsifier such that the final fat and/or oil content in the chocolate is 25 to 65% by mass, and through a mixing step, a refining step (refining), a conching step (conching), a cooling step, and so forth. Particularly, since the chocolate of the present invention is cooled and solidified without tempering, the tempering process is not necessary. Note that normal chocolates are preferably subjected to the tempering process.

<Method for Producing Powdered Chocolate>

The powdered chocolate containing the powdered fat and/or oil composition of the present invention can be easily produced by simply mixing together the above-described chocolate raw materials (such as the powdered fat and/or oil composition, a flavoring substance, a lipid, a saccharide, a protein, or other ingredients), unlike conventional methods. This is because a powdered fat and/or oil composition constituted of 100% fat and/or oil and having a low melting point, which has never existed, is obtained by the present invention. Herein, the "low melting point" of the powdered fat and/or oil composition means 23 to 45° C., more preferably 25 to 35° C., and furthermore preferably 27 to 30° C. This makes it possible to easily produce a variety of foods including the powdered chocolate. Among these, for example, a high-lipid ketogenic food (ketogenic diet) can also be easily produced. Note that, as will be described later, existing powdered fats and/or oils constituted of 100% fats and/or oils generally have high melting points, and powdered chocolates cannot be produced using such powdered fats and/or oils. However, a powdered chocolate can be produced, for example, by adding a flavoring substance such as a cocoa powder, a saccharide such as sugar, and further, as necessary, a flavor and a sweetener to the powdered fat and/or oil composition of the present invention, and uniformly mixing together. The mixing can be easily performed by hand using a spatula or the like. Nevertheless, for example, for the mass production, the chocolate raw materials can also be mixed together by using a machine such as a V blender, a Nauta mixer, a Henschel mixer, or a fluidized-bed mixer.

<Ketogenic Diet Therapy>

A "ketogenic diet therapy" has been developed to mimic a fasting state without decreasing calories, and has been often used to treat human epilepsy. Although the mechanism of how a ketogenic diet therapy is effective in the epilepsy treatment is still unknown, the phenomenon has been known from a far past (5th century BC). For example, it has been believed according to a certain theory that if saccharides and proteins are restricted, the insulin signal transduction is decreased, consequently promoting fatty acid utilization and inducing ketone body production. Thereby, the concentration of ketone bodies in the blood is increased, so that ketosis is maintained for a long period. This is a characteristic of a ketogenic diet therapy.

Since a large amount of lipids are provided in a ketogenic diet therapy, sufficient calories are obtained. However, the low insulin signal transduction forms a certain fasting state. Moreover, the low insulin signal transduction increases the activities of lipoprotein lipases in non-adipose tissues, and stimulates the intake of free fatty acids and the fatty acid oxidation in muscle and liver tissues. The fatty acid oxidation in the liver produces a high level of acetyl-CoA, which is utilized in the ketone body production. Since the liver has no enzyme for metabolizing ketone bodies, ketone bodies are released in the blood and utilized in peripheral tissue cells. Further, when the concentration of ketone bodies in the blood is increased, the glucose utilization is decreased, so that the low state of the insulin signal transduction persists.

Such a "ketogenic diet therapy" enables treatments against certain diseases. Examples of candidates therefor include treatments against seizure of idiopathic epilepsy, a decrease in body weight, psychological problems such as obsessive-compulsive disorder and separation anxiety, muscle metabolisms such as fatigue and weakening, type 2 diabetes due to insulin secretion or deficiency disorder, and other similar diseases. Recently, it has been found that ketone bodies serve as an energy source for brain activities in place of saccharides, and are also possibly effective in treatments against certain neurodegenerative diseases, for example, Parkinson's disease, Alzheimer's disease, and the like. Moreover, since cancer cells utilize a large amount of saccharides as an energy source, there has also been proposed a cancer treatment method of starving cancer cells, which cannot effectively utilize ketone bodies, by eating saccharide-restrictive diets to thereby utilize ketone bodies as a main energy source.

Thus, the (powdered) food such as the "chocolate" and the "powdered chocolate" of the present invention can be an effective ketogenic diet in improving the seizure frequency of epilepsy patients and relieving the severity of the seizures. Particularly, the food is believed to be effective for epilepsy patients having no congenital metabolic disorders. It is believed that the food also has a low possibility of causing undesirable side effects such as growth retardation, metabolic acidosis, a decrease in immune function, kidney problems, and constipation.

Moreover, the food can be effectively utilized as one component of diets applied to body-weight adjustment and body-weight control plans for adults having a BMI exceeding 25 and other obese persons, particularly, obese persons suffering from metabolic syndrome or insulin resistance. Further, it would be also effective as a therapeutic food for patients suffering from senile dementia or Alzheimer's dementia, and patients suffering from certain cancers. In addition, it is also expected to exhibit effects for preventing these diseases.

EXAMPLES

Next, the present invention will be described in detail by way of Reference Examples and Examples.

[Analysis Method]

Triglyceride Composition

Gas chromatography analysis conditions

DB1-ht (0.32 mm×0.1 μm×5 m) Agilent Technologies Inc. (123-1131)

Injected amount: 1.0 μL

Injection inlet: 370° C.

Detector: 370° C.

Split ratio: 50/1 at a 35.1-kPa constant pressure

Column CT: 200° C. (0 min hold) to (15° C./min) to 370° C. (4 min hold)

Loose Bulk Density

The loose bulk densities (g/cm$^3$) of powdered fat and/or oil compositions obtained in Examples and so forth were determined by: letting each of the powdered fat and/or oil compositions fall approximately 2 cm above an upper opening end of a graduated cylinder with an inner diameter 15 mm×25 mL to loosely fill the graduated cylinder; measuring a mass (g) and reading a volume (mL) thus filled; and calculating a mass (g) of the powdered fat and/or oil composition per mL.

Crystal (Micrograph)

Figure 4:
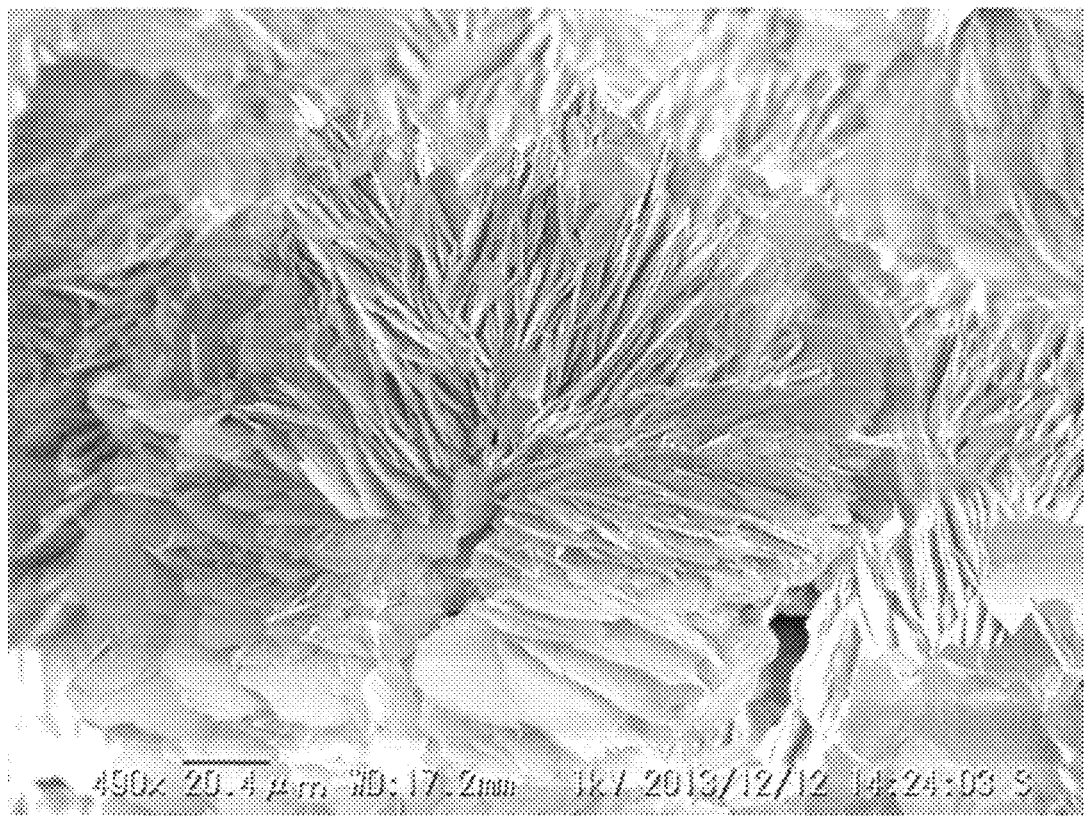
FIG. 4 is a micrograph of the powdered fat and/or oil composition of Example 11 of the present invention.
Figure 5:
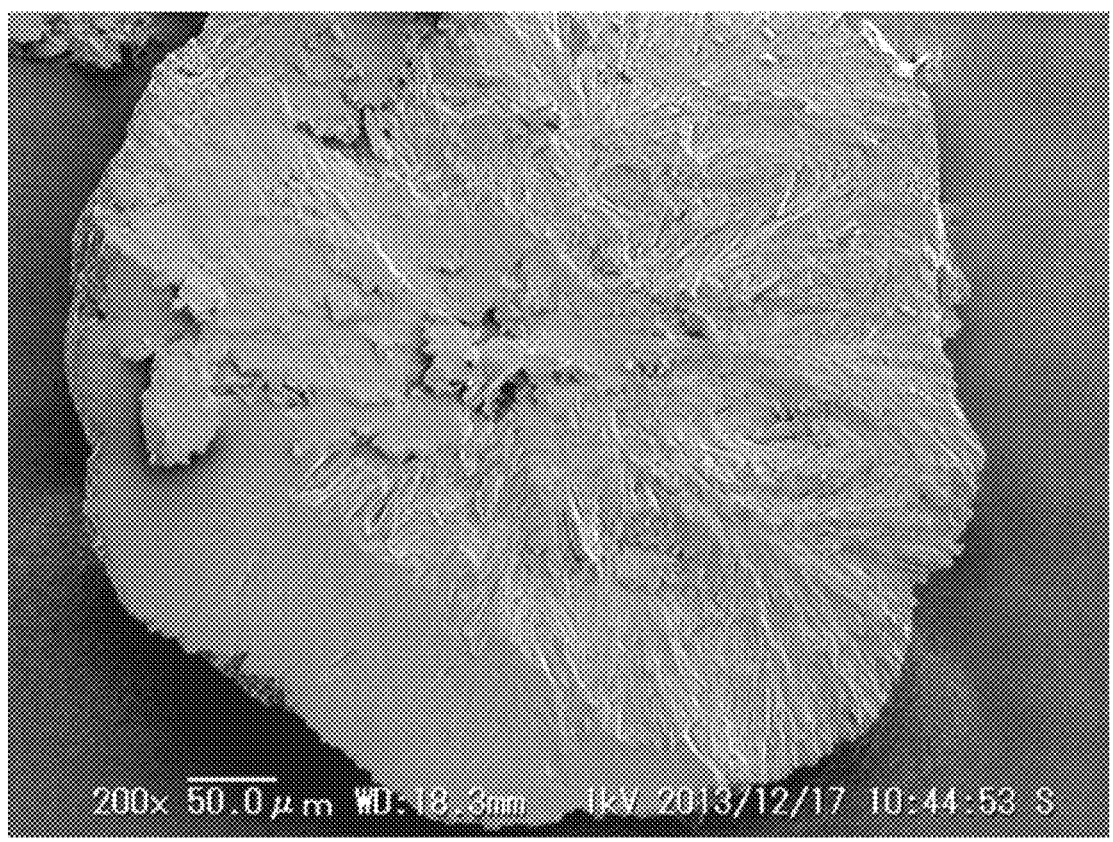
FIG. 5 is a micrograph of the fat and/or oil composition of Comparative Example 1 of the present invention.

Images of crystals of the obtained fat and/or oil compositions were captured using a 3D real surface view microscope VE-8800 (manufactured by Keyence Corporation). The obtained micrographs are shown in FIG. 4 (Example 11) and FIG. 5 (Comparative Example 1).

Average Particle Diameter

The average particle diameters were measured based on laser diffraction/scattering methods (IS0133201, ISO9276-1) using a particle size distribution measuring apparatus (Microtrac MT3300ExII manufactured by Nikkiso Co., Ltd.).

Production Example 1

Synthesis Method for XXX Triglyceride (Tricaprin)

Into a 3000-mL four-necked flask equipped with a stirrer, a thermometer, a nitrogen gas inlet tube, and a water separator, 288.9 g (3.14 mol) of glycerin (manufactured by Sakamoto Yakuhin Kogyo Co., Ltd.) and 1911.2 g (11.1 mol; 3.5 moles relative to 1 mole of glycerin) of capric acid {Palmac 99-10 (manufactured by Acidchem International Sdn Bhd)} were placed. After these were reacted under a nitrogen stream at 180° C. for 2 hours, the temperature was increased to 250° C., and the reaction was allowed to proceed for 10 hours. Excessive capric acid was distilled off at 170° C. under a reduced pressure of 400 Pa (3 Torr), followed by bleaching, filtration, and deodorization. Thus, 1505 g of a pale yellow liquid reaction product at 50° C. was obtained (tricaprin).

Production Example 2

Synthesis Method for XXX Triglyceride (Trilaurin)

Into a 3000-mL four-necked flask equipped with a stirrer, a thermometer, a nitrogen gas inlet tube, and a water separator, 288.9 g (3.14 mol) of glycerin (manufactured by Sakamoto Yakuhin Kogyo Co., Ltd.) and 2023.0 g (10.1 mol; 3.2 moles relative to 1 mole of glycerin) of lauric acid {Palmac 98-12 (manufactured by Acidchem International Sdn Bhd) } were placed. After these were reacted under a nitrogen stream at 180° C. for 2 hours, the temperature was increased to 250° C., and the reaction was allowed to proceed for 12 hours. Excessive lauric acid was distilled off at 200° C. under a reduced pressure of 400 Pa (3 Torr), followed by bleaching, filtration, and deodorization. Thus, 1607 g of a pale yellow liquid reaction product at 50° C. was obtained (trilaurin).

Production Example 3

Synthesis Method for X2Y (XXX:X2Y=97:3) Triglyceride

Into a 500-mL four-necked flask equipped with a stirrer, a thermometer, a nitrogen gas inlet tube, and a water separator, 44.9 g (0.488 mol) of glycerin (manufactured by Sakamoto Yakuhin Kogyo Co., Ltd.), 7.7 g (0.027 mol) of stearic acid {Palmac 98-18 (manufactured by Acidchem International Sdn Bhd)}, and 168.1 g (0.976 mol) of capric acid {Palmac 99-10 (manufactured by Acidchem International Sdn Bhd)} were placed (a total number of moles of stearic acid and capric acid relative to 1 mole of glycerin; 2.1 moles). These were reacted under a nitrogen stream ata temperature of 230° C. for 5 hours until no free stearic acid was observed by gas chromatography. Then, 114.9 g (0.667 mol) of capric acid was added to and reacted with the resultant at a temperature of 250° C. for another 10 hours. Excessive capric acid was distilled off at 190° C. under a reduced pressure of 667 Pa (5 Torr), followed by bleaching and deodorization. Thus, 182 g of a pale yellow liquid triglyceride mixture at 50° C. was obtained (XXX triglyceride:X2Y triglyceride (mass ratio)=97:3).

Example 1 x=10, y=18, Preparation Step I, Tempering Process (c2)

With 97 g of a triglyceride having capric acid residues (each having 10 carbon atoms) at positions 1 to 3 (XXX type, tricaprin, manufactured by The Nisshin OilliO Group, Ltd.), 3 g of a triglyceride having stearic acid residues (each having 18 carbon atoms) at positions 1 to 3 (YYY type, tristearin, manufactured by Tokyo Chemical Industry Co., Ltd.) was mixed. An *Alcaligenes* sp.-derived powdered enzyme Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 93.7% by mass, X2Y type: 5.0% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition (loose bulk density: 0.3 g/cm$^3$, average particle diameter of 141 μm) was obtained.

Example 2 x=10, y=18, Preparation Step I, Tempering Process (c2)

With 98 g of a triglyceride having capric acid residues (each having 10 carbon atoms) at positions 1 to 3 (XXX type, tricaprin, manufactured by The Nisshin OilliO Group, Ltd.), 2 g of a triglyceride having stearic acid residues (each having 18 carbon atoms) at positions 1 to 3 (YYY type, tristearin, (manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 95.8% by mass, X2Y type: 2.6% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 193 μm).

Example 3 x=10, y=16, Preparation Step I, Tempering Process (c2)

With 98 g of a triglyceride having capric acid residues (each having 10 carbon atoms) at positions 1 to 3 (XXX type, tricaprin, manufactured by The Nisshin OilliO Group, Ltd.), 2 g of a triglyceride having palmitic acid residues (each having 16 carbon atoms) at positions 1 to 3 (YYY type, tripalmitin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 95.1% by mass, X2Y type: 4.0% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 166 μm).

Example 4 x=10, y=14, Preparation Step I, Tempering Process (c2)

With 96 g of a triglyceride having capric acid residues (each having 10 carbon atoms) at positions 1 to 3 (XXX type, tricaprin, manufactured by The Nisshin OilliO Group, Ltd.), 4 g of a triglyceride having myristic acid residues (each having 14 carbon atoms) at positions 1 to 3 (YYY type, trimyristin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 91.4% by mass, X2Y type: 7.6% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.4 g/cm$^3$, average particle diameter of 165 μm).

Example 5 x=12, y=18, Preparation Step I

With 97 g of a triglyceride having lauric acid residues (each having 12 carbon atoms) at positions 1 to 3 (XXX type, trilaurin, manufactured by The Nisshin OilliO Group, Ltd.), 3 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 93.4% by mass, X2Y type: 5.3% by mass). The obtained reaction product was maintained at 80° C. for 0.5 hours and completely melted. The resultant was left standing for 24 hours in a thermostatic chamber at 35° C. A porous solid with an increased volume was formed and then loosened. Thus, a powdered crystalline composition was obtained (loose bulk density: 0.4 g/cm$^3$, average particle diameter of 218 μm).

Example 6 x=12, y=16, Preparation Step I

With 96 g of a triglyceride having lauric acid residues (each having 12 carbon atoms) at positions 1 to 3 (XXX type, trilaurin, manufactured by The Nisshin OilliO Group, Ltd.), 4 g of a triglyceride having palmitic acid residues (each having 16 carbon atoms) at positions 1 to 3 (YYY type, tripalmitin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 90.4% by mass, X2Y type: 8.8% by mass). The obtained reaction product was maintained at 80° C. for 0.5 hours and completely melted. The resultant was left standing for 24 hours in a thermostatic chamber at 35° C. A porous solid with an increased volume was formed and then loosened. Thus, a powdered crystalline composition was obtained (loose bulk density: 0.4 g/cm$^3$, average particle diameter of 192 μm).

Example 7 x=14, y=18, Preparation Step I

With 97 g of a triglyceride having myristic acid residues (each having 14 carbon atoms) at positions 1 to 3 (XXX type, trimyristin, manufactured by Tokyo Chemical Industry Co., Ltd.), 3 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 92.6% by mass, X2Y type: 6.1% by mass). The obtained reaction product was maintained at 80° C. for 0.5 hours and completely melted. The resultant was left standing in a thermostatic chamber at 47° C. for 12 hours. A porous solid with an increased volume was formed and then loosened. Thus, a powdered crystalline composition was obtained (loose bulk density: 0.4 g/cm$^3$, average particle diameter of 159 μm).

Example 8 x=14, y=22, Preparation Step I

With 99 g of a triglyceride having myristic acid residues (each having 14 carbon atoms) at positions 1 to 3 (XXX type, trimyristin, manufactured by Tokyo Chemical Industry Co., Ltd.), 1 g of a triglyceride having behenic acid residues (each having 22 carbon atoms) at positions 1 to 3 (YYY type, tribehehin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 97.7% by mass, X2Y type: 1.4% by mass). The obtained reaction product was maintained at 80° C. for 0.5 hours and completely melted. The resultant was left standing in a thermostatic chamber at 44° C. for 12 hours. A porous solid with an increased volume was formed and then loosened. Thus, a powdered crystalline composition was obtained (loose bulk density: 0.4 g/cm$^3$, average particle diameter of 203 μm).

Example 9 x=16, y=18, Preparation Step I

With 99 g of a triglyceride having palmitic acid residues (each having 16 carbon atoms) at positions 1 to 3 (XXX type, tripalmitin, manufactured by Tokyo Chemical Industry Co., Ltd.), 1 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 89.4% by mass, X2Y type: 6.2% by mass). The obtained reaction product was maintained at 80° C. for 0.5 hours and completely melted. The resultant was left standing in a thermostatic chamber at 55° C. for 12 hours. A porous solid with an increased volume was formed and then loosened. Thus, a powdered crystalline composition was obtained (loose bulk density: 0.4 g/cm$^3$, average particle diameter of 336 μm).

Example 10 x=16, y=22, Preparation Step I

With 99 g of a triglyceride having palmitic acid residues (each having 16 carbon atoms) at positions 1 to 3 (XXX type, tripalmitin, manufactured by Tokyo Chemical Industry Co., Ltd.), 1 g of a triglyceride having behenic acid residues (each having 22 carbon atoms) at positions 1 to 3 (YYY type, tribehehin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 88.0% by mass, X2Y type: 6.5% by mass). The obtained reaction product was maintained at 80° C. for 0.5 hours and completely melted. The resultant was left standing in a thermostatic chamber at 55° C. for 12 hours. A porous solid with an increased volume was formed and then loosened. Thus, a powdered crystalline composition was obtained (loose bulk density: 0.4 g/cm$^3$, average particle diameter of 281 μm).

Example 11 x=10, y=12 to 18, Preparation Step I, Tempering Process (c2)

With 95 g of a triglyceride having capric acid residues (each having 10 carbon atoms) at positions 1 to 3 (XXX type, tricaprin, manufactured by The Nisshin OilliO Group, Ltd.), 5 g of a highly hydrogenated palm kernel stearin oil (containing 85% by mass of a YYY triglyceride, manufactured by The Nisshin OilliO Group, Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 89.0% by mass, X2Y type: 9.8% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 152 μm).

Example 12 x=10, y=16 to 22, Preparation Step I, Tempering Process (c2)

With 97 g of a triglyceride having capric acid residues (each having 10 carbon atoms) at positions 1 to 3 (XXX type, tricaprin, manufactured by The Nisshin OilliO Group, Ltd.), 3 g of a highly hydrogenated rapeseed oil (containing 100% by mass of a YYY triglyceride, manufactured by Yokozeki Oil & Fat Industries Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 94.0% by mass, X2Y type: 4.6% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 181 μm).

Example 13 x=10, y=16 to 22, Preparation Step I, Tempering Process (c2)

With 97 g of a triglyceride having capric acid residues (each having 10 carbon atoms) at positions 1 to 3 (XXX type, tricaprin, manufactured by The Nisshin OilliO Group, Ltd.), 3 g of a highly hydrogenated high-erucic acid rapeseed oil (containing 100% by mass of a YYY triglyceride, manufactured by Yokozeki Oil & Fat Industries Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 93.9% by mass, X2Y type: 4.9% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (bulk density: 0.3 g/cm$^3$, average particle diameter of 177 µm).

Example 14 x=10, y=12 to 18, Preparation Step I, Tempering Process (c2)

With 475 g of a triglyceride having capric acid residues (each having 10 carbon atoms) at positions 1 to 3 (XXX type, tricaprin, manufactured by The Nisshin OilliO Group, Ltd.), 25 g of a highly hydrogenated palm kernel stearin oil (containing 85% by mass of a YYY triglyceride, manufactured by The Nisshin OilliO Group, Ltd.) was mixed. A catalyst sodium methoxide was added in an amount of 0.2% by mass relative to the raw material fats for the subsequent reaction therebetween with stirring under a reduced pressure (300 Pa) at 100° C. for 0.5 hours. A saturated aqueous solution of citric acid was used for the neutralization, and the catalyst was removed by water washing, followed by bleaching and deodorization according to ordinary methods. Thereby, 400 g of the reaction product was obtained (XXX type: 88.3% by mass, X2Y type: 10.4% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 139 µm).

Example 15 x=10, y=18, Preparation Step II, Tempering Process (c2)
Into a 500-mL four-necked flask equipped with a stirrer, a thermometer, a nitrogen gas inlet tube, and a water separator, 44.9 g (0.488 mol) of glycerin (manufactured by Sakamoto Yakuhin Kogyo Co., Ltd.), 7.7 g (0.027 mol) of stearic acid (Palmac 98-18 (manufactured by Acidchem International Sdn Bhd)), and 168.1 g (0.976 mol) of capric acid (Palmac 99-10 (manufactured by Acidchem International Sdn Bhd)) were placed. These were reacted under a nitrogen stream at a temperature of 230° C. for 5 hours until no free stearic acid was observed by gas chromatography. Then, 114.9 g (0.667 mol) of capric acid was added to and reacted with the resultant at a temperature of 250° C. for another 10 hours. Excessive capric acid was distilled off at 190° C. under a reduced pressure of 667 Pa (5 Torr), followed by bleaching, filtration, and deodorization. Thus, 182 g of a pale yellow liquid reaction product at 50° C. was obtained (XXX type: 93.6% by mass, X2Y type: 5.2% by mass). The obtained reaction product was maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 180 µm).

Example 16 x=10, y=12 to 18, Preparation Step I, Seeding Process (c1)

With 475 g of a triglyceride having capric acid residues (each having 10 carbon atoms) at positions 1 to 3 (XXX type, tricaprin, manufactured by The Nisshin OilliO Group, Ltd.), 25 g of a highly hydrogenated palm kernel stearin oil (containing 85% by mass of a YYY triglyceride, manufactured by The Nisshin OilliO Group, Ltd.) was mixed. A catalyst sodium methoxide was added in an amount of 0.2% by mass relative to the raw material fats for the subsequent reaction therebetween with stirring under a reduced pressure at 100° C. for 0.5 hours. A saturated aqueous solution of citric acid was used for the neutralization, and the catalyst was removed by water washing, followed by bleaching and deodorization. Thereby, 400 g of the reaction product was obtained (XXX type: 88.3% by mass, X2Y type: 10.4% by mass). The obtained reaction product was maintained at 80° C. for 0.5 hours and completely melted. The resultant was cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.5% by mass relative to the raw material fats, and left standing in the thermostatic chamber at 20° C. for 6 hours. A porous solid with an increased volume was formed and then loosened. Thus, a powdered crystalline composition was obtained (loose bulk density: 0.3 g/cm$^3$, average particle diameter of 137 µm).

Example 17 x=10, y=12 to 18, Preparation Step I, Seeding Process (c1)

With 475 g of a triglyceride having capric acid residues (each having 10 carbon atoms) at positions 1 to 3 (XXX type, tricaprin, manufactured by The Nisshin OilliO Group, Ltd.), 25 g of a highly hydrogenated palm kernel stearin oil (containing 85% by mass of a YYY triglyceride, manufactured by The Nisshin OilliO Group, Ltd.) was mixed. A catalyst sodium methoxide was added in an amount of 0.2% by mass relative to the raw material fats for the subsequent reaction therebetween with stirring under a reduced pressure at 100° C. for 0.5 hours. A saturated aqueous solution of citric acid was used for the neutralization, and the catalyst was removed by water washing, followed by bleaching and deodorization. Thereby, 400 g of the reaction product was obtained (XXX type: 88.3% by mass, X2Y type: 10.4% by mass). The obtained reaction product was maintained at 80° C. for 0.5 hours and completely melted. The resultant was cooled in a thermostatic chamber at 27° C. until the product temperature reached 27° C. Then, the powdered crystalline composition obtained in Example 16 was added in an amount of 0.5% by mass relative to the raw material fats, and left standing in the thermostatic chamber at 20° C. for 6 hours. A porous solid with an increased volume was formed and then loosened. Thus, a powdered crystalline composition was obtained (loose bulk density: 0.3 g/cm$^3$, average particle diameter of 160 μm).

Example 18 x=10, y=12 to 18, Preparation Step I, Seeding Process (c1)

With 95 g of a triglyceride having capric acid residues (each having 10 carbon atoms) at positions 1 to 3 (XXX type, tricaprin, manufactured by The Nisshin OilliO Group, Ltd.), 5 g of a highly hydrogenated palm kernel stearin oil (containing 85% by mass of a YYY triglyceride, manufactured by The Nisshin OilliO Group, Ltd.) was mixed. Lipase QLM (manufactured by Meito Sangyo Co. Ltd.) was added in an amount of 1% by mass relative to the raw material fats for the reaction therebetween with stirring at 80° C. for 24 hours. The powdered enzyme was removed at approximately 70° C. by vacuum filtration (using FILTER PAPER manufactured by ADVANTEC Group). Thereby, 99.5 g of the reaction product was obtained. (XXX type: 89.0% by mass, X2Y type: 9.8% by mass). The obtained reaction product was maintained at 80° C. for 0.5 hours and completely melted. The resultant was cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.5% by mass relative to the raw material fats, and left standing in the thermostatic chamber at 20° C. for 6 hours. A porous solid with an increased volume was formed and then loosened. Thus, a powdered crystalline composition was obtained (loose bulk density: 0.3 g/cm$^3$, average particle diameter of 148 μm).

Example 19 x=10, y=12 to 18, Preparation Step I, Seeding Process (c1)

With 95 g of a triglyceride having capric acid residues (each having 10 carbon atoms) at positions 1 to 3 (XXX type, tricaprin, manufactured by The Nisshin OilliO Group, Ltd.), 5 g of a highly hydrogenated palm kernel stearin oil (containing 85% by mass of a YYY triglyceride, manufactured by The Nisshin OilliO Group, Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 89.0% by mass, X2Y type: 9.8% by mass). The obtained reaction product was maintained at 80° C. for 0.5 hours and completely melted. The resultant was cooled in a thermostatic chamber at 27° C. until the product temperature reached 27° C. Then, the powdered crystalline composition obtained in Example 18 was added in an amount of 0.5% by mass relative to the raw material fats, and left standing in the thermostatic chamber at 20° C. for 6 hours. A porous solid with an increased volume was formed and then loosened. Thus, a powdered crystalline composition was obtained (loose bulk density: 0.3 g/cm$^3$, average particle diameter of 153 μm).

Example 20 x=10, y=12 to 18, Preparation Step III, Tempering Process (c2)

With 80 g of tricaprin (manufactured by The Nisshin OilliO Group, Ltd.), 20 g of a highly hydrogenated palm kernel stearin oil (containing 85% by mass of a YYY triglyceride, manufactured by The Nisshin OilliO Group, Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 57.8% by mass, X2Y type: 39.6% by mass). Raw material fats (XXX type: 90.4% by mass, X2Y type: 8.4% by mass) were prepared by mixing 50 g of the obtained reaction product with 150 g of tricaprin (manufactured by The Nisshin OilliO Group, Ltd.). The raw material fats were maintained at 80° C. for 0.5 hours and completely melted. The resultant was cooled in a thermostatic chamber at 10° C. for 1 hour, and then left standing in the thermostatic chamber at 20° C. for 12 hours. As a result, a porous solid with an increased volume was formed and then loosened. Thus, a powdered crystalline composition was obtained (loose bulk density: 0.3 g/cm$^3$, average particle diameter of 211 μm).

Example 21 x=10, y=12 to 18, Preparation Step III, Seeding Process (c1)

With 80 g of tricaprin (manufactured by The Nisshin OilliO Group, Ltd.), 20 g of a highly hydrogenated palm kernel stearin oil (containing 85% by mass of a YYY triglyceride, manufactured by The Nisshin OilliO Group, Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 57.8% by mass, X2Y type: 39.6% by mass). Raw material fats (XXX type: 90.4% by mass, X2Y type: 8.4% by mass) were prepared by mixing 50 g of the obtained reaction product with 150 g of tricaprin (manufactured by The Nisshin OilliO Group, Ltd.). The obtained reaction product was maintained at 80° C. for 0.5 hours and completely melted. The resultant was cooled in a thermostatic chamber at 27° C. until the product temperature reached 27° C. Then, a fat powder obtained by cooling and solidifying tricaprin (manufactured by The Nisshin OilliO Group, Ltd.) with liquid nitrogen and pulverizing the resultant with a freeze pulverizer (manufactured by AS ONE Corporation) was added in an amount of 0.5% by mass relative to the raw material fats, and left standing in the thermostatic chamber at 20° C. for 6 hours. As a result, a porous solid with an increased volume was formed and then loosened. Thus, a powdered crystalline composition was obtained (loose bulk density: 0.3 g/cm$^3$, average particle diameter of 199 μm).

Example 22 x=12, y=18, Preparation Step I, Tempering Process
(c2)

With 96 g of a triglyceride having lauric acid residues (each having 12 carbon atoms) at positions 1 to 3 (XXX type, trilaurin, manufactured by The Nisshin OilliO Group, Ltd.), 4 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 91.0% by mass, X2Y type: 7.3% by mass). The obtained reaction product was maintained at 80° C. for 0.5 hours and completely melted. The resultant was cooled in a thermostatic chamber at 28° C. for 0.5 hours, and then left standing in the thermostatic chamber at 35° C. for 12 hours. A porous solid with an increased volume was formed and then loosened. Thus, a powdered crystalline composition was obtained (loose bulk density: 0.3 g/cm$^3$, average particle diameter of 238 μm).

Example 23 x=12, y=18, Preparation Step I, Tempering Process
(c2)

With 96 g of a triglyceride having lauric acid residues (each having 12 carbon atoms) at positions 1 to 3 (XXX type, trilaurin, manufactured by The Nisshin OilliO Group, Ltd.), 4 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 91.0% by mass, X2Y type: 7.3% by mass). The obtained reaction product was maintained at 80° C. for 0.5 hours and completely melted. The resultant was cooled in a thermostatic chamber at 28° C. for 1 hour, and then left standing in the thermostatic chamber at 35° C. for 12 hours. A porous solid with an increased volume was formed and then loosened. Thus, a powdered crystalline composition was obtained (loose bulk density: 0.3 g/cm$^3$, average particle diameter of 178 μm).

Example 24 x=12, y=18, Preparation Step I, Seeding Process
(c1)

With 96 g of a triglyceride having lauric acid residues (each having 12 carbon atoms) at positions 1 to 3 (XXX type, trilaurin, manufactured by The Nisshin OilliO Group, Ltd.), 4 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of the reaction product was obtained (XXX type: 91.0% by mass, X2Y type: 7.3% by mass). The obtained reaction product was maintained at 80° C. for 0.5 hours and completely melted. The resultant was cooled in a thermostatic chamber at 39° C. until the product temperature reached 39° C. Then, the fat powder obtained in Example 22 was added in an amount of 0.5% by mass relative to the raw material fats, and left standing in the thermostatic chamber at 35° C. for 6 hours. A porous solid with an increased volume was formed and then loosened. Thus, a powdered crystalline composition was obtained (loose bulk density: 0.3 g/cm$^3$, average particle diameter of 157 μm).

Example 25 x=12, y=18, Preparation Step I, Seeding Process
(c1)

With 97 g of a triglyceride having lauric acid residues (each having 12 carbon atoms) at positions 1 to 3 (XXX type, trilaurin, manufactured by The Nisshin OilliO Group, Ltd.), 3 g of a triglyceride having stearic acid residues (each having 18 carbon atoms) at positions 1 to 3 (YYY type, tristearin, manufactured by Tokyo Chemical Industry Co., Ltd.) was mixed. Lipase QLM (manufactured by Meito Sangyo Co. Ltd.) was added in an amount of 1% by mass relative to the raw material fats for the reaction therebetween with stirring at 80° C. for 12 hours. The powdered enzyme was removed at approximately 70° C. by vacuum filtration (using FILTER PAPER manufactured by ADVANTEC Group). Thereby, 99.5 g of a reaction product A was obtained (XXX type: 93.2% by mass, X2Y type: 5.3% by mass). The reaction product A was mixed with tricaprin (manufactured by The Nisshin OilliO Group, Ltd.) at 70:30, then maintained at 80° C. for 0.5 hours, and completely melted. The resultant was cooled in a thermostatic chamber at 39° C. until the product temperature reached 39° C. Then, the fat powder obtained in Example 22 was added in an amount of 0.5% by mass relative to the raw material fats, and left standing in the thermostatic chamber at 34° C. for 6 hours. A porous solid with an increased volume was formed and then loosened. Thus, a powdered crystalline composition was obtained (XXX type: 66.1% by mass, X2Y: 3.6% by mass) (loose bulk density: 0.3 g/cm$^3$, average particle diameter of 293 μm).

Example 26 x=10, y=18, Preparation Step III, Tempering
Process (c2)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 94.0% by mass, X2Y type: 5.2% by mass) were prepared by mixing 60 g of the obtained reaction product with 140 g of tricaprin (manufactured by The Nisshin OilliO Group, Ltd.). The raw material fats were cooled in a thermostatic chamber at 15° C. for 0.2 hours, and then left standing in the thermostatic chamber at 20° C. for 75 hours. A porous solid with an increased volume was formed and then loosened. Thus, a powdered crystalline composition was obtained (loose bulk density: 0.3 g/cm$^3$, average particle diameter of 133 μm).

Example 27 x=10, y=18, Preparation Step III

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 94.0% by mass, X2Y type: 5.2% by mass) were prepared by mixing 60 g of the obtained reaction product with 140 g of tricaprin (manufactured by The Nisshin OilliO Group, Ltd.). The temperature of the raw material fats was adjusted in a thermostatic chamber at 60° C. until the product temperature reached 60° C., and then left standing in the thermostatic chamber at 20° C. for 140 hours. A porous solid with an increased volume was formed and then loosened. Thus, a powdered crystalline composition was obtained (loose bulk density: 0.3 g/cm$^3$, average particle diameter of 101 μm).

Example 28 x=10, y=18, Preparation Step III, Pre-Cooling Process (c3)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 94.0% by mass, X2Y type: 5.2% by mass) were prepared by mixing 60 g of the obtained reaction product with 140 g of tricaprin (manufactured by The Nisshin OilliO Group, Ltd.). The temperature of the raw material fats was adjusted in a thermostatic chamber at 40° C. until the product temperature reached 40° C., and then left standing in the thermostatic chamber at 20° C. for 60 hours. A porous solid with an increased volume was formed and then loosened. Thus, a powdered crystalline composition was obtained (loose bulk density: 0.3 g/cm$^3$, average particle diameter of 122 μm).

Example 29 x=10, y=18, Preparation Step III, Pre-Cooling Process (c3)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 94.0% by mass, X2Y type: 5.2% by mass) were prepared by mixing 60 g of the obtained reaction product with 140 g of tricaprin (manufactured by The Nisshin OilliO Group, Ltd.). The temperature of the raw material fats was adjusted in a thermostatic chamber at 27° C. until the product temperature reached 27° C., and then left standing in the thermostatic chamber at 20° C. for 24 hours. A porous solid with an increased volume was formed and then loosened. Thus, a powdered crystalline composition was obtained (loose bulk density: 0.3 g/cm$^3$, average particle diameter of 102 μm).

Example 30 x=10, y=18, Preparation Step III, Seeding Process (c1)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 97.7% by mass, X2Y type: 1.6% by mass) were prepared by mixing 18.5 g of the obtained reaction product with 181.5 g of tricaprin (manufactured by The Nisshin OilliO Group, Ltd.). The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 26° C. for 6 hours. A porous solid with an increased volume was formed and then loosened. Thus, a powdered crystalline composition was obtained (loose bulk density: 0.2 g/cm³, average particle diameter of 89 μm)

Example 31 x=10, y=18, Preparation Step III, Seeding Process (c1)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 96.8% by mass, X2Y type: 2.4% by mass) were prepared by mixing 28 g of the obtained reaction product with 172 g of tricaprin (manufactured by The Nisshin OilliO Group, Ltd.). The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 23° C. for 6 hours. A porous solid with an increased volume was formed and then loosened. Thus, a powdered crystalline composition was obtained (loose bulk density: 0.3 g/cm³, average particle diameter of 97 μm)

Example 32 x=10, y=18, Preparation Step III, Seeding Process (c1)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 89.1% by mass, X2Y type: 9.7% by mass) were prepared by mixing 112 g of the obtained reaction product with 88 g of tricaprin (manufactured by The Nisshin OilliO Group, Ltd.). The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 19° C. for 6 hours. A porous solid with an increased volume was formed and then loosened. Thus, a powdered crystalline composition was obtained (loose bulk density: 0.3 g/cm³, average particle diameter of 167 μm)

Example 33 x=10, y=18, Preparation Step III, Seeding Process (c1)

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type: 94.0% by mass, X2Y type: 5.2% by mass) were prepared by mixing 60 g of the obtained reaction product with 140 g of tricaprin (manufactured by The Nisshin OilliO Group, Ltd.). The raw material fats were cooled in a thermostatic chamber at 27° C. until the product temperature reached 27° C. Then, the powdered crystalline composition obtained in Example 29 was added in an amount of 0.1% by mass relative to the raw material fats, and left standing in the thermostatic chamber at 16° C. for 6 hours. A porous solid with an increased volume was formed and then loosened. Thus, a powdered crystalline composition was obtained (loose bulk density: 0.3 g/cm³, average particle diameter of 185 μm)

Example 34 x=10, y=14, Preparation Step III, Seeding Process (c1)

Into a 500-mL four-necked flask equipped with a stirrer, a thermometer, a nitrogen gas inlet tube, and a water separator, 44.4 g (0.482 mol) of glycerin (manufactured by Sakamoto Yakuhin Kogyo Co., Ltd.), 25.6 g (0.112 mol) of myristic acid (Palmac 98-14 (manufactured by Acidchem International Sdn Bhd)), and 265.6 g (1.541 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 186 g of a pale yellow liquid reaction product at 50° C. was obtained (XXX type: 80.6% by mass, X2Y type: 17.0% by mass). Raw material fats (XXX type: 91.9% by mass, X2Y type: 6.8% by mass) were prepared by mixing 80 g of the obtained reaction product with 120 g of tricaprin (manufactured by The Nisshin OilliO Group, Ltd.).

The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 20° C. for 6 hours. A porous solid with an increased volume was formed and then loosened. Thus, a powdered crystalline composition was obtained (loose bulk density: 0.2 g/cm$^3$, average particle diameter of 75 μm)

Example 35 x=10, y=14, Preparation Step III, Seeding Process (c1)

Into a 500-mL four-necked flask equipped with a stirrer, a thermometer, a nitrogen gas inlet tube, and a water separator, 44.4 g (0.482 mol) of glycerin (manufactured by Sakamoto Yakuhin Kogyo Co., Ltd.), 25.6 g (0.112 mol) of myristic acid (Palmac 98-14 (manufactured by Acidchem International Sdn Bhd)), and 265.6 g (1.541 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 186 g of a pale yellow liquid reaction product at 50° C. was obtained (XXX type: 80.6% by mass, X2Y type: 17.0% by mass). Raw material fats (XXX type: 91.9% by mass, X2Y type: 6.8% by mass) were prepared by mixing 80 g of the obtained reaction product with 120 g of tricaprin (manufactured by The Nisshin OilliO Group, Ltd.). The raw material fats were cooled in a thermostatic chamber at 27° C. until the product temperature reached 27° C. Then, the powdered crystalline composition obtained in Example 34 was added in an amount of 0.1% by mass relative to the raw material fats, and left standing in the thermostatic chamber at 14° C. for 6 hours. A porous solid with an increased volume was formed and then loosened. Thus, a powdered crystalline composition was obtained (loose bulk density: 0.3 g/cm$^3$, average particle diameter of 174 μm)

Example 36 x=10, y=14, Preparation Step III, Seeding Process (c1)

Into a 500-mL four-necked flask equipped with a stirrer, a thermometer, a nitrogen gas inlet tube, and a water separator, 44.4 g (0.482 mol) of glycerin (manufactured by Sakamoto Yakuhin Kogyo Co., Ltd.), 25.6 g (0.112 mol) of myristic acid (Palmac 98-14 (manufactured by Acidchem International Sdn Bhd)), and 265.6 g (1.541 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 186 g of a pale yellow liquid reaction product at 50° C. was obtained (XXX type: 80.6% by mass, X2Y type: 17.0% by mass). Raw material fats (XXX type: 86.1% by mass, X2Y type: 12.4% by mass) were prepared by mixing 146 g of the obtained reaction product with 54 g of tricaprin (manufactured by The Nisshin OilliO Group, Ltd.). The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 20° C. for 6 hours. A porous solid with an increased volume was formed and then loosened. Thus, a powdered crystalline composition was obtained (loose bulk density: 0.4 g/cm$^3$, average particle diameter of 199 μm)

Example 37 x=10, y=14, Preparation Step III, Seeding Process (c1)

Into a 500-mL four-necked flask equipped with a stirrer, a thermometer, a nitrogen gas inlet tube, and a water separator, 44.4 g (0.482 mol) of glycerin (manufactured by Sakamoto Yakuhin Kogyo Co., Ltd.), 25.6 g (0.112 mol) of myristic acid (Palmac 98-14 (manufactured by Acidchem International Sdn Bhd)), and 265.6 g (1.541 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 186 g of a pale yellow liquid reaction product at 50° C. was obtained (XXX type: 80.6% by mass, X2Y type: 17.0% by mass). Raw material fats (XXX type: 93.8% by mass, X2Y type: 5.0% by mass) were prepared by mixing 59 g of the obtained reaction product with 141 g of tricaprin (manufactured by The Nisshin OilliO Group, Ltd.). The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 23° C. for 6 hours. A porous solid with an increased volume was formed and then loosened. Thus, a powdered crystalline composition was obtained (loose bulk density: 0.3 g/cm$^3$, average particle diameter of 109 μm)

Example 38 x=10, y=14, Preparation Step III, Seeding Process (c1)

Into a 500-mL four-necked flask equipped with a stirrer, a thermometer, a nitrogen gas inlet tube, and a water separator, 44.4 g (0.482 mol) of glycerin (manufactured by Sakamoto Yakuhin Kogyo Co., Ltd.), 25.6 g (0.112 mol) of myristic acid (Palmac 98-14 (manufactured by Acidchem International Sdn Bhd)), and 265.6 g (1.541 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 186 g of a pale yellow liquid reaction product at 50° C. was obtained (XXX type: 80.6% by mass, X2Y type: 17.0% by mass). Raw material fats (XXX type:

97.7% by mass, X2Y type: 1.2% by mass) were prepared by mixing 14 g of the obtained reaction product with 186 g of tricaprin (manufactured by The Nisshin OilliO Group, Ltd.). The raw material fats were cooled in a thermostatic chamber at 27° C. until the product temperature reached 27° C. Then, a fat powder obtained by cooling and solidifying the tricaprin (manufactured by The Nisshin OilliO Group, Ltd.) with liquid nitrogen and pulverizing the resultant with a freeze pulverizer (manufactured by AS ONE Corporation) was added in an amount of 0.1% by mass relative to the raw material fats, and left standing in the thermostatic chamber at 26° C. for 6 hours. A porous solid with an increased volume was formed and then loosened. Thus, a powdered crystalline composition was obtained (loose bulk density: 0.2 g/cm$^3$, average particle diameter of 87 μm)

Comparative Example 1

At 80° C., 100 g of a triglyceride having capric acid residues (each having 10 carbon atoms) at positions 1 to 3 (XXX type, tricaprin, manufactured by The Nisshin OilliO Group, Ltd.) was maintained for 0.5 hours and completely melted. The triglyceride was cooled in a thermostatic chamber at 10° C. for 1 hour, and then left standing in the thermostatic chamber at 20° C. for 12 hours. As a result, the resultant was completely solidified, and a powdered crystalline composition was not obtained.

Comparative Example 2

At 80° C., 100 g of a triglyceride having capric acid residues (each having 10 carbon atoms) at positions 1 to 3 (XXX type, tricaprin, manufactured by The Nisshin OilliO Group, Ltd.) was maintained for 0.5 hours and completely melted. The triglyceride was left standing in a thermostatic chamber at 20° C. for 12 hours. As a result, the resultant was completely solidified, and a powdered crystalline composition was not obtained.

Comparative Example 3

With 97 g of a triglyceride having capric acid residues (each having 10 carbon atoms) at positions 1 to 3 (XXX type, tricaprin, manufactured by The Nisshin OilliO Group, Ltd.), 3 g of tristearin (manufactured by Tokyo Chemical Industry Co., Ltd.) was mixed. The mixed fats were maintained at 80° C. for 0.5 hours and completely melted. The resultant was cooled in a thermostatic chamber at 10° C. for 1 hour, and then left standing in the thermostatic chamber at 20° C. for 12 hours. As a result, the resultant was completely solidified, and a powdered crystalline composition was not obtained.

Comparative Example 4

With 80 g of tricaprin (manufactured by The Nisshin OilliO Group, Ltd.), 20 g of a highly hydrogenated palm kernel stearin oil (containing 85% by mass of a YYY triglyceride, manufactured by The Nisshin OilliO Group, Ltd.) was mixed. Lipase QLM (manufactured by Meito Sangyo Co. Ltd.) was added in an amount of 1% by mass relative to the raw material fats for the reaction therebetween with stirring at 80° C. for 24 hours. The powdered enzyme was removed at approximately 70° C. by vacuum filtration (using FILTER PAPER manufactured by ADVANTEC Group). Thereby, 99.5 g of the reaction product was obtained (XXX type: 57.8% by mass, X2Y type: 39.6% by mass). The obtained reaction product was cooled in a thermostatic chamber at 10° C. for 1 hour, and then left standing in the thermostatic chamber at 20° C. for 24 hours. As a result, the resultant was not completely solidified, and a powdered crystalline composition was not obtained.

Table 1 summarizes the results of Examples and Comparative Examples above.

TABLE 1

| | x number of carbon atoms | y number of carbon atoms | XXX triglyceride (% by mass) | X2Y triglyceride (% by mass) | loose bulk density (g/cm$^3$) | average particle diameter (μm) | Catalyst | Preparation step | tempering temperature/ hour | cooling final temperature/ hour |
|---|---|---|---|---|---|---|---|---|---|---|
| Example 1 | 10 | 18 | 93.7 | 5.0 | 0.3 | 141 | QLM | I (c2) | 10° C./1 hour | 20° C./12 hours |
| Example 2 | 10 | 18 | 95.8 | 2.6 | 0.3 | 193 | QLM | I (c2) | 10° C./1 hour | 20° C./12 hours |
| Example 3 | 10 | 16 | 95.1 | 4.0 | 0.3 | 166 | QLM | I (c2) | 10° C./1 hour | 20° C./12 hours |
| Example 4 | 10 | 14 | 91.4 | 7.6 | 0.4 | 165 | QLM | I (c2) | 10° C./1 hour | 20° C./12 hours |
| Example 5 | 12 | 18 | 93.4 | 5.3 | 0.4 | 218 | QLM | I | — | 35° C./24 hours |
| Example 6 | 12 | 16 | 90.4 | 8.8 | 0.4 | 192 | QLM | I | — | 35° C./24 hours |
| Example 7 | 14 | 18 | 92.6 | 6.1 | 0.4 | 159 | QLM | I | — | 47° C./12 hours |
| Example 8 | 14 | 22 | 97.7 | 1.4 | 0.4 | 203 | QLM | I | — | 44° C./12 hours |
| Example 9 | 16 | 18 | 89.4 | 6.2 | 0.4 | 336 | QLM | I | — | 55° C./12 hours |
| Example 10 | 16 | 22 | 88.0 | 6.5 | 0.4 | 281 | QLM | I | — | 55° C./12 hours |
| Example 11 | 10 | 12-18 | 89.0 | 9.8 | 0.3 | 152 | QLM | I (c2) | 10° C./1 hour | 20° C./12 hours |
| Example 12 | 10 | 16-22 | 94.0 | 4.6 | 0.3 | 181 | QLM | I (c2) | 10° C./1 hour | 20° C./12 hours |
| Example 13 | 10 | 16-22 | 93.9 | 4.9 | 0.3 | 177 | QLM | I (c2) | 10° C./1 hour | 20° C./12 hours |

TABLE 1-continued

| | x number of carbon atoms | y number of carbon atoms | XXX triglyceride (% by mass) | X2Y triglyceride (% by mass) | loose bulk density (g/cm³) | average particle diameter (μm) | Catalyst | Preparation step | tempering temperature/ hour | cooling final temperature/ hour |
|---|---|---|---|---|---|---|---|---|---|---|
| Example 14 | 10 | 12-18 | 88.3 | 10.4 | 0.3 | 139 | Na methoxide | I (c2) | 10° C./1 hour | 20° C./12 hours |
| Example 15 | 10 | 18 | 93.6 | 5.2 | 0.3 | 180 | — | II (c2) | 10° C./1 hour | 20° C./12 hours |
| Example 16 | 10 | 12-18 | 88.3 | 10.4 | 0.3 | 137 | Na methoxide | I (c1) | — | 20° C./6 hours |
| Example 17 | 10 | 12-18 | 88.3 | 10.4 | 0.3 | 160 | Na methoxide | I (c1) | — | 20° C./6 hours |
| Example 18 | 10 | 12-18 | 89.0 | 9.8 | 0.3 | 148 | QLM | I (c1) | — | 20° C./6 hours |
| Example 19 | 10 | 12-18 | 89.0 | 9.8 | 0.3 | 153 | QLM | I (c1) | — | 20° C./6 hours |
| Example 20 | 10 | 12-18 | 90.4 | 8.4 | 0.3 | 211 | QLM | III (c2) | 10° C./1 hour | 20° C./12 hours |
| Example 21 | 10 | 12-18 | 90.4 | 8.4 | 0.3 | 199 | QLM | III (c1) | — | 20° C./6 hours |
| Example 22 | 12 | 18 | 91.0 | 7.3 | 0.3 | 238 | QLM | I (c2) | 28° C./0.5 hours | 35° C./12 hours |
| Example 23 | 12 | 18 | 91.0 | 7.3 | 0.3 | 178 | QLM | I (c2) | 28° C./1 hour | 35° C./12 hours |
| Example 24 | 12 | 18 | 91.0 | 7.3 | 0.3 | 157 | QLM | I (c1) | — | 35° C./6 hours |
| Example 25 | 12 | 18 | 66.1 | 3.6 | 0.3 | 293 | QLM | I (c1) | — | 34° C./6 hours |
| Example 26 | 10 | 18 | 94.0 | 5.2 | 0.3 | 133 | — | III (c2) | 15° C./1 hour | 20° C./75 hours |
| Example 27 | 10 | 18 | 94.0 | 5.2 | 0.3 | 101 | — | III | — | 20° C./140 hours |
| Example 28 | 10 | 18 | 94.0 | 5.2 | 0.3 | 122 | — | III (c3) | — | 20° C./60 hours |
| Example 29 | 10 | 18 | 94.0 | 5.2 | 0.3 | 102 | — | III (c3) | — | 20° C./24 hours |
| Example 30 | 10 | 18 | 97.7 | 1.6 | 0.2 | 89 | — | III (c1) | — | 26° C./6 hours |
| Example 31 | 10 | 18 | 96.8 | 2.4 | 0.3 | 97 | — | III (c1) | — | 23° C./6 hours |
| Example 32 | 10 | 18 | 89.1 | 9.7 | 0.3 | 167 | — | III (c1) | — | 19° C./6 hours |
| Example 33 | 10 | 18 | 94.0 | 5.2 | 0.3 | 185 | — | III (c1) | — | 16° C./6 hours |
| Example 34 | 10 | 14 | 91.9 | 6.8 | 0.2 | 75 | — | III (c1) | — | 20° C./6 hours |
| Example 35 | 10 | 14 | 91.9 | 6.8 | 0.3 | 174 | — | III (c1) | — | 14° C./6 hours |
| Example 36 | 10 | 14 | 86.1 | 12.4 | 0.4 | 199 | — | III (c1) | — | 20° C./6 hours |
| Example 37 | 10 | 14 | 93.8 | 5.0 | 0.3 | 109 | — | III (c1) | — | 23° C./6 hours |
| Example 38 | 10 | 14 | 97.7 | 1.2 | 0.2 | 87 | — | III (c1) | — | 26° C./6 hours |
| Comparative Example 1 | 10 | — | — | — | — | — | — | — | 10° C./1 hour | 20° C./12 hours |
| Comparative Example 2 | 10 | — | — | — | — | — | — | — | — | 20° C./12 hours |
| Comparative Example 3 | 10 | — | — | — | — | — | — | — | 10° C./1 hour | 20° C./12 hours |
| Comparative Example 4 | 10 | 12-18 | 57.8 | 39.6 | — | — | QLM | — | — | 20° C./6 hours |

[Examples of Foods]

Next, the present invention will be described in further details based on Examples and Comparative Examples related to foods. However, the present invention is not limited to these at all. Moreover, in the following description, "%" means % by mass, unless otherwise noted.

<Raw Material Fat and/or Oil>

Powdered fat and/or oil composition A (melting point: approximately 28° C.):

[x=10, y=18, Tempering Process]

Into a 500-mL four-necked flask equipped with a stirrer, a thermometer, a nitrogen gas inlet tube, and a water separator, 44.1 g (0.479 mol) of glycerin (manufactured by Sakamoto Yakuhin Kogyo Co., Ltd.), 25.9 g (0.091 mol) of stearic acid (Palmac 98-18 (manufactured by Acidchem International Sdn Bhd)), and 266.0 g (1.544 mol) of capric acid (Palmac 99-10 (manufactured by Acidchem International Sdn Bhd)) were placed. These were reacted under a nitrogen stream at a temperature of 250° C. for 15 hours. Excessive capric acid was distilled off at 190° C. under a reduced pressure, followed by bleaching, filtration, and deodorization. Thus, 245 g of a pale yellow liquid reaction product at 50° C. was obtained (XXX type: 80.6% by mass, X2Y type: 17.3% by mass). Raw material fats (XXX type:

94.0% by mass, X2Y type: 5.2% by mass) were prepared by mixing 60 g of the obtained reaction product with 140 g of tricaprin (manufactured by The Nisshin OilliO Group, Ltd.). The raw material fats were maintained at 80° C. for 0.5 hours and completely melted. The resultant was cooled in a thermostatic chamber at 10° C. for 1 hour, and then left standing in the thermostatic chamber at 20° C. for 12 hours. A porous solid with an increased volume was formed and then loosened. Thus, a powdered crystalline composition was obtained (loose bulk density: 0.3 g/cm$^3$, average particle diameter of 116 μm). A powdered fat and/or oil composition A produced in this manner was used in the following Examples.

<Other Raw Materials>

Used in Examples described later were commercially-available: cocoa butter (manufactured by Daito Cacao Co., Ltd.), a cocoa powder (Cocoa Powder DF500: manufactured by Daito Cacao Co., Ltd.), powdered sugar (MGP Huntou: manufactured by Tokukura Corporation), a chocolate flavor (Chocoreito Kouton IL36882: manufactured by Ogawa & Co., Ltd.), a sweetener A (Mirasee NK: manufactured by DSP Gokyo Food & Chemical Co., Ltd.), a sweetener B (Sucralose: manufactured by San-Ei Gen F.F..I., Inc.), a matcha powder (Kyoto Match Powder (Wakakusa): manufactured by Cuoca Planning Co., Ltd.), a matcha flavor (Matcha Kouton IL36883: manufactured by Ogawa & Co., Ltd.), powdered milk (whole milk powder: manufactured by Yotsuba Milk Products Co., Ltd.), lecithin (manufactured by The Nisshin OilliO Group, Ltd.), a vanilla flavor (manufactured by Givaudan S.A.), cacao mass (manufactured by Daito Cacao Co., Ltd.), and sugar (manufactured by Tokukura Corporation).

Examples 39 and 40 and Comparative Example 5

<Chocolate Production>

According to the formulas in Table 2 below, chocolates of Examples 39 and 40 and Comparative Example 5 were produced by cooling and solidification through a mixing process, a refining process, and a conching process according to ordinary methods. In more details, raw materials (such as cacao mass, cocoa butter) were uniformly mixed with a mixer (universal mixing stirrer 8XDML: manufactured by DALTON Corporation) by heating to 60° C. for approximately 5 minutes. Thus, a chocolate mix was obtained. The obtained chocolate mix was ground and refined with a roll refiner (SDY hydraulic three-roll mill: manufactured by BUHLER AG) to an average particle size of approximately 20 μm. The refined chocolate mix was kneaded using the mixer for 20 minutes or longer. After the liquefaction, the oil content was adjusted to prepare a liquid raw chocolate. The temperature was adjusted to 30° C., and the liquid raw chocolate was poured into a mold and molded. Then, the liquid raw chocolate was cooled and solidified at 10 to 20° C. Example 39 was prepared such that the ratio of the mass of the powdered fat and/or oil composition A to the mass of the cocoa butter was 50:50, and Example 40 was prepared such that the ratio of the mass of the powdered fat and/or oil composition A to the mass of the cocoa butter was 95:5. Meanwhile, Comparative Example 5 was produced by using not the powdered fat and/or oil composition but normal cocoa butter. Note that the cacao mass contained 55% by mass of cocoa butter. Moreover, the cocoa powder contained 11% by mass of cocoa butter. Hence, the cocoa butter content in Example 39 was 2.0+360.0×0.55=200.0 (g). The cocoa butter content in Example 40 was 181.8×0.11=approximately 20.0 (g).

TABLE 2

Chocolate formula and evaluation

| Blended raw materials | Example 39 (g) | Example 39 (%) | Example 40 (g) | Example 40 (%) | Comparative Example 5 (g) | Comparative Example 5 (%) |
|---|---|---|---|---|---|---|
| Cocoa butter | 2.0 | 0.2 | — | — | 202.0 | 20.2 |
| Powdered fat and/or oil composition A | 200.0 | 20.0 | 380.0 | 38.0 | — | — |
| Lecithin | 5.0 | 0.5 | 5.0 | 0.5 | 5.0 | 0.5 |
| Vanilla flavor | 0.5 | 0.05 | 0.5 | 0.05 | 0.5 | 0.05 |
| Cacao mass | 360.0 | 36.0 | — | — | 360.0 | 36.0 |
| Cocoa powder | — | — | 181.8 | 18.18 | — | — |
| Sugar | 432.5 | 43.25 | 432.7 | 43.27 | 432.5 | 43.25 |
| Raw material total | 1000.0 | 100.0 | 1000.0 | 100.0 | 1000.0 | 100.0 |
| Evaluation results | | | | | | |
| Mouthfeel | ○ | | ○ | | × | |
| Melt-in-the-mouth | ○ | | ○ | | × | |

<Evaluation of Chocolate>

The chocolates of Examples 39 and 40 and Comparative Example 5 produced above were evaluated according to the following evaluation methods.

<Chocolate Evaluation Methods>

(1) Mouthfeel Evaluation Method

A comprehensive evaluation was conducted by five skilled panelists according to the following criteria.

○: having a light air-in-like mouthfeel
Δ: slightly having a light air-in-like mouthfeel
×: having no light air-in-like mouthfeel (2) Melt-in-the-Mouth Evaluation Method A comprehensive evaluation was conducted by five skilled panelists according to the following criteria ○: having a smooth and good melt-in-the-mouth and a cooling sensation
Δ: slightly lacking a light mouthfeel, a smooth and good melt-in-the-mouth, and a cooling sensation
×: having no light mouthfeel, no smooth and good melt-in-the-mouth, and no cooling sensation As apparent from the result of Table 2, it was found out that the chocolates (Examples 39 and 40) produced by using the powdered fat and/or oil composition of the present invention each had a light air-in-like mouthfeel and a smooth and good melt-in-the-mouth, felt like what is called an aerated chocolate, and were highly preferable chocolates. On the other hand, the chocolate (Comparative Example 5) produced without using the powdered fat and/or oil composition of the present invention had neither a light air-in-like mouthfeel nor a smooth melt-in-the-mouth. Meanwhile, the chocolates (Examples 39 and 40) produced by using the powdered fat and/or oil composition of the present invention had unique cooling sensations and were highly preferable chocolates. On the other hand, the chocolate produced without using the powdered fat and/or oil composition of the present invention did not have such a cooling sensation.

The present invention does not have to use dedicated equipment unlike conventional methods for producing aerated chocolates, and makes it possible to obtain an air-in-like chocolate by blending the powdered fat and/or oil composition of the present invention and simply cooling and solidifying the blend. This suggests a possibility of greatly simplifying existing aerated-chocolate production steps, and the industrial applicability is quite high.

Example 41

<Powdered Chocolate (Plain) Production>

According to the formula in Table 3 below, a powdered chocolate (plain) of Example 41 was produced. More specifically, the cocoa powder, the powdered sugar, the chocolate flavor, and the sweeteners A and B were added to the powdered fat and/or oil composition A put in a container, and mixed together using a spatula. Thus, a powdered chocolate (plain) was prepared. Note that the following cocoa powder contained 11% by mass of a lipid, 20% by mass of a protein, and 44.5% by mass of a saccharide.

TABLE 3

Powdered chocolate (plain) formula, nutritional ingredients, and sensory evaluation

| | Example 41 | | | | |
|---|---|---|---|---|---|
| | Blended raw materials (g) | Lipid content (g) | Protein content (g) | Saccharide content (g) | Energy (kcal) |
| Powdered fat and/or oil composition A | 74.00 | 74.0 | — | — | 666.0 |
| Cocoa powder | 20.00 | 2.2 | 4.0 | 8.9 | 40.0 |
| Powdered sugar | 5.05 | — | — | 5.1 | 19.5 |
| Chocolate flavor | 0.75 | — | — | — | — |
| Sweetener A | 0.15 | — | — | — | — |
| Sweetener B | 0.05 | — | — | — | — |
| Raw material total | 100.00 | 76.2 | 4.0 | 14.0 | 725.5 |
| Ketone ratio | | | 4.2 | | |
| Ketone index | | | 2.9 | | |
| Oily taste | | | ○ | | |
| Ease of eating | | | ○ | | |
| Palatability | | | ○ | | |
| Cooling sensation | | | ○ | | |

<Evaluation of Powdered Chocolate>

The powdered chocolate (plain) of Example 41 produced as described above was subjected to a sensory evaluation according to the following evaluation methods.

<Powdered Chocolate Evaluation Methods>

(1) Oily Taste Evaluation Method

A comprehensive evaluation was conducted by five skilled panelists according to the following criteria.
- ○: not oily
- Δ: slightly oily
- ×: oily (2) Ease-of-Eating Evaluation Method A comprehensive evaluation was conducted by five skilled panelists according to the following criteria.
- ○: easy to eat
- Δ: slightly hard to eat
- ×: hard to eat (3) Palatability Evaluation Method A comprehensive evaluation was conducted by five skilled panelists according to the following criteria.
- ○: having favorable flavor and melt-in-the-mouth, and delicious
- Δ: lacking flavor and melt-in-the-mouth, but somewhat delicious
- ×: poor in flavor and melt-in-the-mouth, and not delicious (4) Cooling-Sensation Evaluation Method A comprehensive evaluation was conducted by five skilled panelists according to the following criteria.
- ○: having a cooling sensation in the mouth.
- Δ: slightly having a cooling sensation in the mouth.
- ×: having no cooling sensation in the mouth.

As apparent from the result of Table 3, the powdered chocolate (Example 41) produced by using the powdered fat and/or oil composition of the present invention was one that can be evaluated as non-oily, easy to eat, also having favorable chocolate flavor and melt-in-the-mouth, and delicious, even though the ratio (mass ratio) of the lipid to the total of the protein and the saccharide was 4 or more and quite high. Moreover, the powdered chocolate had a unique cooling sensation, and was quite highly preferable. Further, since this powdered chocolate can be produced simply by mixing the raw materials together, anyone can produce the powdered chocolate at low cost, and the industrial applicability is quite high. Furthermore, the palatability is comparable to those of normal powdered chocolates (rather the powdered chocolate had a cooling sensation and was highly preferable). Accordingly, the powdered chocolate not only can substitute for conventional powdered chocolates but also can be utilized as, for example, a ketogenic diet without getting tired of continuous eating for a long period.

Example 42

<Powdered Chocolate (Matcha) Production>

According to the formula in Table 4 below, a powdered chocolate (matcha) of Example 42 was produced. More specifically, the matcha powder, the powdered milk, the powdered sugar, the matcha flavor, and the sweeteners A and B were added to the powdered fat and/or oil composition A put in a container, and mixed together using a spatula, Thus, a powdered chocolate (matcha) was prepared. Note that the matcha powder contained 5.3% by mass of a lipid and 30.6% by mass of a protein. In addition, the powdered milk contained 26.2% by mass of a lipid, 25.5% by mass of a protein, and 39.3% by mass of a saccharide. Moreover, the values of the lipid content, the protein content, and the saccharide content were rounded to one decimal place.

TABLE 4

Powdered chocolate (matcha) formula, nutritional ingredients, and sensory evaluation

| | Example 42 | | | | |
|---|---|---|---|---|---|
| | Blended raw materials (g) | Lipid content (g) | Protein content (g) | Saccharide content (g) | Energy (kcal) |
| Powdered fat and/or oil composition A | 75.00 | 75.0 | — | — | 675.0 |
| Matcha powder | 10.00 | 0.5 | 3.1 | — | 32.4 |
| Powdered milk | 3.00 | 0.8 | 0.8 | 1.2 | 15.0 |
| Powdered sugar | 11.05 | — | — | 11.1 | 42.8 |
| Matcha flavor | 0.75 | — | — | — | — |
| Sweetener A | 0.15 | — | — | — | — |
| Sweetener B | 0.05 | — | — | — | — |
| Raw material total | 100.00 | 76.3 | 3.9 | 12.3 | 765.2 |
| Ketone ratio | | | 4.7 | | |
| Ketone index | | | 3.2 | | |
| Oily taste | | | ○ | | |
| Ease of eating | | | ○ | | |
| Palatability | | | ○ | | |
| Cooling sensation | | | ○ | | |

<Evaluation of Powdered Chocolate>

The powdered chocolate (matcha) of Example 42 produced as described above was subjected to a sensory evaluation according to the above-described evaluation methods in Example 41.

As apparent from the result of Table 4, the powdered chocolate (Example 42) produced by using the powdered fat and/or oil composition A of the present invention was one that can be evaluated as non-oily, easy to eat, also having favorable matcha flavor and melt-in-the-mouth, and delicious, even though the ratio (mass ratio) of the lipid to the total of the protein and the saccharide was 4 or more and quite high. Particularly, the flavor of the matcha material was strongly tasted, so that the powdered chocolate adds a matcha flavor to various foods and can be widely utilized as foods having a combination of tastes. Further, since having a unique cooling sensation, the powdered chocolate has a possibility of meeting new needs of consumers, such as by making powdered chocolates for summer.

Comparative Example 6

<Powdered Chocolate (Plain) Production>

According to the formula in Table 5 below, a powdered chocolate (plain) of Comparative Example 6 was produced. More specifically, the cocoa powder, the powdered sugar, the chocolate flavor, and the sweeteners A and B were added into a container in which a fat powder (Spray Fat PM: manufactured by RIKEN VITAMIN CO., LTD., melting point: 67.8° C.) had been put in place of the powdered fat and/or oil composition A of Example 41, and mixed together using a spatula. Thus, a powdered chocolate (plain) was prepared. Note that the cocoa powder contained 11% by mass of a lipid, 20% by mass of a protein, and 44.5% by mass of a saccharide.

TABLE 5

Powdered chocolate (plain) formula, nutritional ingredients, and sensory evaluation

| | Comparative Example 6 | | | | |
| --- | --- | --- | --- | --- | --- |
| | Blended raw materials (g) | Lipid content (g) | Protein content (g) | Saccharide content (g) | Energy (kcal) |
| Fat powder | 74.0 | 74.0 | — | — | 666.0 |
| Cocoa powder | 20.0 | 2.2 | 4.0 | 8.9 | 40.0 |
| Powdered sugar | 5.05 | — | — | 5.1 | 19.5 |
| Chocolate flavor | 0.75 | — | — | — | — |
| Sweetener A | 0.15 | — | — | — | — |
| Sweetener B | 0.05 | — | — | — | — |
| Raw material total | 100.0 | 76.2 | 4.0 | 14.0 | 725.5 |
| Ketone ratio | | | 4.2 | | |
| Ketone index | | | 2.9 | | |
| Oily taste | | | x | | |
| Ease of eating | | | x | | |
| Palatability | | | x | | |
| Cooling sensation | | | x | | |

<Evaluation of Powdered Chocolate>

The powdered chocolate (plain) of Comparative Example 6 produced as described above was subjected to a sensory evaluation according to the above-described evaluation methods in Example 41.

When the above-described fat powder was used for the production in place of the powdered fat and/or oil composition A, the powdered chocolate (plain) of Comparative Example 6 had a gritty mouthfeel and also a strong oily taste, and was hard to eat and not delicious. In conclusion, Comparative Example 6 was one that can be hardly said as a powdered chocolate. Moreover, unlike the case of using the powdered fat and/or oil composition A, the use of the fat powder imparted no unique cooling sensation.

The invention claimed is:

1. A powdered fat and/or oil composition comprising:
   65 to 99% by mass of one type of a XXX triglyceride having fatty acid residues X, each with x carbon atoms, at positions 1 to 3; and
   35 to 1% by mass of one or more types of X2Y triglycerides each having a fatty acid residue Y with y carbon atoms in place of one of the fatty acid residues X of the XXX triglyceride,
   provided that a total triglyceride content is 100% by mass, wherein
   x number of carbon atoms is an integer selected from 8 to 20, and
   y number of carbon atoms is an integer selected from x+2 to x+12 independently from the other y and satisfying y≤22.

2. The powdered fat and/or oil composition according to claim 1, comprising:
   80 to 99% by mass of the XXX triglyceride; and
   20 to 1% by mass of the one or more types of X2Y triglycerides in total.

3. The powdered fat and/or oil composition according to claim 1, wherein
   the x is an integer selected from 10 to 18, and
   the y is an integer selected from x+2 to x+10 independently from the other y and satisfying y≤22.

4. The powdered fat and/or oil composition according to claim 1, wherein
   the x is an integer selected from 10 to 12, and
   the y is an integer selected from x+4 to x+8 independently from the other y and satisfying y≤22.

5. The powdered fat and/or oil composition according to claim 1, which has a loose bulk density of 0.1 to 0.6 g/cm$^3$.

6. A food comprising the powdered fat and/or oil composition according to claim 1.

7. The food according to claim 6, wherein a content of the powdered fat and/or oil composition is 0.1 to 99% by mass relative to a total mass of the food.

8. The food according to claim 6, wherein the food is a powdered food.

9. The food according to claim 6, wherein the food is a ketogenic diet.

10. A method for producing a powdered fat and/or oil composition, comprising the following steps of:
    (a) preparing a fat and/or oil composition containing 65 to 99% by mass of a XXX triglyceride having fatty acid residues X, each with x carbon atoms, at positions 1 to 3, and 35 to 1% by mass of one or more types of X2Y triglycerides each having a fatty acid residue Y with y carbon atoms in place of one of the fatty acid residues X of the XXX triglyceride, provided that a total triglyceride content is 100% by mass, wherein x number of carbon atoms is an integer selected from 8 to 20, and y number of carbon atoms is an integer selected from x+2 to x+12 independently from the other y and satisfying y≤22; and
    (d) cooling the fat and/or oil composition in a molten state to obtain a powdered fat and/or oil composition.

11. The method according to claim 10, comprising, before step (d), a step of (b) heating the fat and/or oil composition obtained in step (a) to melt the triglycerides incorporated in the fat and/or oil composition, thereby obtaining the fat and/or oil composition in the molten state.

12. The method according to claim 10, comprising a seeding step (c1), a tempering step (c2), and/or a pre-cooling step (c3), wherein
- the seeding step (c1) includes adding 0.1 to 1 part by mass of a fat and/or oil powder containing the XXX triglyceride to 100 parts by mass of the fat and/or oil composition during the cooling in step (d),
- the tempering step (c2) includes maintaining a temperature, which is lower by 5 to 20° C. than a cooling temperature in step (d), before the cooling in step (d), and
- the pre-cooling step (c3) includes pre-cooling the fat and/or oil composition in the molten state used in step (d) at a temperature higher than the cooling temperature in step (d).

13. The method according to claim 10, wherein the powdered fat and/or oil composition obtained in step (d) is obtained by step (e) of pulverizing a solid resulting after the cooling in step (d) to obtain a powdered fat and/or oil composition.

14. The method according to claim 10, wherein
the x is an integer selected from 10 to 18, and
the y is an integer selected from x+2 to x+10 independently from the other y and satisfying y≤22.

15. The method according to claim 10, wherein
the x is an integer selected from 10 to 12, and
the y is an integer selected from x+4 to x+8 independently from the other y and satisfying y≤22.

16. The method according to claim 10, wherein
the fat and/or oil composition obtained in step (a) is a fat and/or oil composition obtained through steps of:
- mixing the XXX triglyceride and a YYY triglyceride having fatty acid residues Y, each with y carbon atoms, at positions 1 to 3 at a mass ratio of XXX triglyceride/YYY triglyceride being 90/10 to 99/1 to obtain a reaction substrate; and
- heating the reaction substrate, followed by an interesterification in presence of a catalyst.

17. The method according to claim 10, wherein the fat and/or oil composition obtained in step (a) is produced by direct synthesis from raw materials including fatty acids or raw materials including fatty acid derivatives and glycerin.

18. A method for producing a food containing a powdered fat and/or oil composition, the method comprising the steps of:
- producing a powdered fat and/or oil composition by the method according to claim 10; and
- (f) adding the powdered fat and/or oil composition to a food raw material to obtain a food containing the powdered fat and/or oil composition.

19. A food additive comprising a powdered fat and/or oil composition comprising:
- 65 to 99% by mass of a XXX triglyceride having fatty acid residues X, each with x carbon atoms, at positions 1 to 3; and
- 35 to 1% by mass of one or more types of X2Y triglycerides each having a fatty acid residue Y with y carbon atoms in place of one of the fatty acid residues X of the XXX triglyceride
- provided that a total triglyceride content is 100% by mass, wherein
- x number of carbon atoms is an integer selected from 8 to 20, and
- x number of carbon atoms is an integer selected from x+2 to x+12 independently from the other y and satisfying y≤22.

* * * * *